US012603734B2

(12) United States Patent
Ji et al.

(10) Patent No.: US 12,603,734 B2
(45) Date of Patent: Apr. 14, 2026

(54) UPLINK TRANSMISSION METHOD AND APPARATUS

(71) Applicant: HUAWEI TECHNOLOGIES CO., LTD., Shenzhen (CN)

(72) Inventors: Liuliu Ji, Shanghai (CN); Haicun Hang, Shanghai (CN); Hongzhe Shi, Shenzhen (CN); Xiang Ren, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 915 days.

(21) Appl. No.: 17/707,235

(22) Filed: Mar. 29, 2022

(65) Prior Publication Data

US 2022/0224466 A1     Jul. 14, 2022

Related U.S. Application Data

(63) Continuation of application No. PCT/CN2019/109575, filed on Sep. 30, 2019.

(51) Int. Cl.
H04L 5/00 (2006.01)
H04W 16/14 (2009.01)
(Continued)

(52) U.S. Cl.
CPC ........... H04L 5/0035 (2013.01); H04W 16/14 (2013.01); H04W 52/146 (2013.01); H04W 52/365 (2013.01)

(58) Field of Classification Search
CPC .. H04L 5/0035; H04W 16/14; H04W 52/146; H04W 52/365
See application file for complete search history.

(56) References Cited

U.S. PATENT DOCUMENTS

2016/0309417 A1* 10/2016 Han ..................... H04W 52/36
2019/0124558 A1     4/2019 Ang et al.
(Continued)

FOREIGN PATENT DOCUMENTS

CN        103155659 A      6/2013
CN        103299592 A      9/2013
(Continued)

OTHER PUBLICATIONS

Nokia Siemens Networks , "Remaining issues on uplink power control ", 3GPP TSG RAN WG1 #61bis Meeting R1-103792,2010-07-02, total 6 pages.
(Continued)

*Primary Examiner* — Curtis B Odom
(74) *Attorney, Agent, or Firm* — WOMBLE BOND DICKINSON (US) LLP

(57)        ABSTRACT

Embodiments of this application provide an uplink transmission method and apparatus, a computer-readable storage medium, a computer program product, and the like, to implement intra-frequency uplink transmission by a terminal device. The method includes: determining a plurality of serving cells, where the plurality of serving cells have at least one of the following association relationships: operating frequency bands are completely the same, or the operating frequency bands are partially the same; and sending uplink signals to the plurality of serving cells, where the sending of the uplink signal meets a preset condition.

18 Claims, 6 Drawing Sheets

(51) Int. Cl.
*H04W 52/14* (2009.01)
*H04W 52/36* (2009.01)

(56) References Cited

U.S. PATENT DOCUMENTS

| | | | | |
|---|---|---|---|---|
| 2019/0313343 A1* | 10/2019 | MolavianJazi | ..... | H04W 52/146 |
| 2019/0313348 A1* | 10/2019 | MolavianJazi | ..... | H04W 52/281 |
| 2019/0364517 A1* | 11/2019 | Gaal | ..................... | H04W 76/16 |

FOREIGN PATENT DOCUMENTS

| | | |
|---|---|---|
| CN | 107154840 A | 9/2017 |
| CN | 109699067 A | 4/2019 |
| EP | 2775633 A1 | 9/2014 |
| EP | 3139672 A1 | 3/2017 |
| WO | 2015113484 A1 | 8/2015 |

OTHER PUBLICATIONS

3GPP TS 38.211 V15.7.0:"3rd Generation Partnership Project; Technical Specification Group Radio Access Network; NR; Physical channels and modulation (Release 15)",Sep. 2019,total 97 pages.
3GPP TS 38.212 V15.7.0 (Sep. 2019), 3rd Generation Partnership Project; Technical Specification Group Radio Access Network; NR; Multiplexing and channel coding(Release 15), 101 pages.
3GPP TS 38.213 V15.7.0 (Sep. 2019), 3rd Generation Partnership Project; Technical Specification Group Radio Access Network; NR; Physical layer procedures for control(Release 15), 108 pages.
3GPP TS 38.214 V15.7.0 (Sep. 2019), 3rd Generation Partnership Project; Technical Specification Group Radio Access Network; NR; Physical layer procedures for data(Release 15), 106 pages.

* cited by examiner

100

Non-collaborated

JT

CS/CB

DCS

UPLINK TRANSMISSION METHOD AND APPARATUS

CROSS-REFERENCE TO RELATED APPLICATIONS

This application is a continuation of International Application No. PCT/CN2019/109575, filed on Sep. 30, 2019. The disclosure of the aforementioned application is hereby incorporated by reference in its entirety.

TECHNICAL FIELD

This application relates to the field of communication technologies, and in particular, to an uplink transmission method and apparatus.

BACKGROUND

In a modem communication system, to improve spectrum utilization, intra-frequency deployment is usually used. That is, a plurality of cells in a network may be deployed on a same frequency band. In this case, a terminal device may receive signals from the plurality of cells. When a user is located in an edge area, the terminal device may be interfered with signals from neighboring cells other than a current cell. As a result, a channel condition is poor. To better resolve interference between cells and improve a user rate, a coordinated multi-point (CoMP) transmission technology is widely used. Via the CoMP technology, a plurality of intra-frequency transmission reception points (TRPs) may serve the terminal device through coordination.

Currently, the terminal device may support a carrier aggregation (CA) technology. Via the CA technology, a plurality of carriers may be configured for the terminal device to simultaneously perform uplink and downlink data communication. However, currently, the CA technology mainly supports inter-frequency transmission and does not support intra-frequency transmission. Therefore, currently, there is no solution to how the terminal device performs intra-frequency uplink and downlink transmission on the plurality of TPRs.

SUMMARY

Embodiments of this application provide an uplink transmission method and apparatus, a downlink transmission method and apparatus, a coordinated transmission method and apparatus, a chip, a computer-readable storage medium, a computer program product, and the like, to implement intra-frequency transmission by a terminal device.

According to a first aspect, an embodiment of this application provides an uplink transmission method. The method may be used in a terminal device, or a chip or a chipset in the terminal device, and includes: determining a plurality of serving cells, where the plurality of serving cells have at least one of the following association relationships: operating frequency bands are completely the same, or the operating frequency bands are partially the same; and sending uplink signals to the plurality of serving cells, where the sending of the uplink signals meets a preset condition. In this embodiment of this application, the relationship between the serving cells is established, so that the terminal device implements intra-frequency uplink transmission.

In one embodiment, the plurality of serving cells are determined based on indication information from a base station. The indication information is used to indicate that the plurality of serving cells have at least one of the following association relationships: the operating frequency bands are completely the same, or the operating frequency bands are partially the same. In one embodiment, the base station indicates, to the terminal device by using the indication information, the plurality of serving cells that have the association relationship, so that the terminal device can determine the association relationship between the serving cells.

In one embodiment, the plurality of serving cells are determined based on configuration information of the plurality of serving cells from a base station. In one embodiment, the base station implicitly indicates, to the terminal device by using the configuration information, the plurality of serving cells that have the association relationship, so that the terminal device can determine the association relationship between the serving cells while reducing signaling overheads.

In one embodiment, the configuration information includes frequency domain configuration information, and frequency domain resources configured in frequency domain configuration information of the plurality of serving cells have at least one of the following relationships: frequency bands partially overlap, or the frequency bands completely overlap. In one embodiment, the terminal device may determine the association relationship between the plurality of cells by using the frequency domain configuration information of the plurality of serving cells without increasing signaling overheads.

In one embodiment, the preset condition may include at least one of the following: A total power of the uplink signals of the plurality of serving cells is less than or equal to a maximum transmit power of the terminal device; the total power of the uplink signals of the plurality of serving cells is less than or equal to a maximum transmit power of the terminal device on an overlapping frequency band, where the overlapping frequency band is an overlapping part of the operating frequency bands of the plurality of serving cells; and a power of the uplink signal of any one of the plurality of serving cells is less than or equal to a maximum transmit power of the terminal device in any serving cell. In one embodiment, the terminal device performs joint power control on the plurality of associated serving cells, so that a total power of uplink intra-frequency transmission does not exceed a maximum transmit power of the terminal device, to implement uplink intra-frequency transmission for the plurality of serving cells.

In one embodiment, before the uplink signals are sent to the plurality of serving cells, if the sending of the uplink signal does not meet the preset condition, power back-off may be performed on a power of the uplink signal of at least one of the plurality of serving cells. In one embodiment, power back-off is performed on the serving cell, so that uplink intra-frequency transmission can be better implemented.

In one embodiment, power back-off is performed on the power of the uplink signal of at least one of the plurality of serving cells based on priorities of the plurality of serving cells. In one embodiment, power back-off is performed with reference to the priorities, to better ensure transmission performance of the terminal device.

In one embodiment, a transmit power headroom may be further determined based on the total power of the uplink signals of the plurality of serving cells. In one embodiment, during uplink intra-frequency transmission, the transmit power headroom is reported with reference to the total power of the uplink signals of the plurality of serving cells, so that the base station can perform resource scheduling more accurately.

In one embodiment, the preset condition may be that the uplink signals are sent to the plurality of serving cells in a time division manner. In one embodiment, uplink scheduling in the serving cells is limited, so that a total power of uplink intra-frequency transmission does not exceed a maximum transmit power of the terminal device, and uplink intra-frequency transmission can be implemented.

According to a second aspect, an embodiment of this application provides an uplink transmission method. The method may be applied to a base station, or a chip or a chipset in the base station, and includes: configuring a plurality of serving cells for a terminal device, where the plurality of serving cells have at least one of the following association relationships: operating frequency bands are completely the same, or operating frequency bands are partially the same; and indicating to the terminal device that the plurality of serving cells have at least one of the following association relationships: the operating frequency bands are completely the same, or the operating frequency bands are partially the same. In this embodiment of this application, the relationship between the serving cells is established, and the base station indicates, to the terminal device, the association relationship indicated by the serving cells, so that the terminal device implements intra-frequency uplink transmission.

In one embodiment, when it is indicated, to the terminal device, that the plurality of serving cells have at least one of the following association relationships: the operating frequency bands are completely the same, or the operating frequency bands are partially the same, indication information may be sent to the terminal device. The indication information is used to indicate that the plurality of serving cells have at least one of the following association relationships: the operating frequency bands are completely the same, or the operating frequency bands are partially the same. In one embodiment, the base station indicates, to the terminal device by using the indication information, the plurality of serving cells that have the association relationship, so that the terminal device can determine the association relationship between the serving cells.

In one embodiment, at least one of the following association relationships of the plurality of serving cells is indicated to the terminal device by using configuration information of the serving cells: the operating frequency bands are completely the same, or the operating frequency bands are partially the same. In one embodiment, the base station implicitly indicates, to the terminal device by using the configuration information, the plurality of serving cells that have the association relationship, so that the terminal device can determine the association relationship between the serving cells while reducing signaling overheads.

In one embodiment, the configuration information includes frequency domain configuration information. In frequency domain resources configured in frequency domain configuration information of the plurality of serving cells, frequency bands partially overlap, or the frequency bands completely overlap. In one embodiment, the base station may indicate the association relationship between the plurality of cells by using the frequency domain configuration information of the plurality of serving cells without increasing signaling overheads.

According to a third aspect, an embodiment of this application provides a coordinated transmission method, where the method may be applied to a base station, or a chip or a chipset in the base station, and includes: receiving first scheduling information of at least one base station, where the first scheduling information is used to schedule an uplink frequency domain resource; and determining first scheduling information of a current base station based on the first scheduling information of the at least one base station. A frequency domain resource scheduled by the first scheduling information of the current base station and a frequency domain resource scheduled by the first scheduling information of the at least one base station have at least one of the following relationships: frequency bands are completely the same, or the frequency bands are partially the same. In this embodiment of this application, the base stations exchange respective scheduling information used to schedule an uplink frequency domain resource, so that the base stations can establish an association relationship.

In one embodiment, second scheduling information of the at least one base station is received, where the second scheduling information is used to schedule an uplink time domain resource. Second scheduling information of the current base station is determined based on the second scheduling information of the at least one base station, where a time domain resource scheduled by the second scheduling information of the current base station is different from a time domain resource scheduled by the second scheduling information of the at least one base station. In one embodiment, the base stations exchange respective scheduling information used to schedule an uplink time domain resource, so that time division uplink scheduling can be performed between the base stations, and a total power of uplink intra-frequency transmission does not exceed a maximum transmit power of the terminal device, to implement the uplink intra-frequency transmission.

In one embodiment, third scheduling information of the at least one base station is received, where the third scheduling information is used to schedule a downlink transmission resource. Third scheduling information of the current base station is determined based on the third scheduling information of the at least one base station, where a code division multiplexing (CDM) group in which a demodulation reference signal (DMRS) scheduled by the third scheduling information of the current base station is located is different from a CDM group in which a DMRS scheduled by the second scheduling information of the at least one base station is located. In one embodiment, the base stations exchange respective scheduling information used to schedule a downlink transmission resource, so that a DMRS of data scheduled by a plurality of TRPs can use different CDM groups, that is, time-frequency resources are orthogonal to each other, to ensure better performance of DMRS channel estimation.

According to a fourth aspect, an embodiment of this application provides a coordinated transmission method. The method may be applied to a base station, or a chip or a chipset in the base station, and includes: determining corresponding first scheduling information of at least one base station, where the first scheduling information is used to schedule an uplink frequency domain resource, and frequency domain resources scheduled by the first scheduling information of the at least one base station have at least one of the following relationships: frequency bands are completely the same, or the frequency bands are partially the same; and sending the corresponding first scheduling information to the at least one base station. In this embodiment of this application, a centralized control device allocates, to base stations, scheduling information used to schedule an uplink frequency domain resource, so that an association relationship can be established between the base stations.

In one embodiment, corresponding second scheduling information of the at least one base station is determined, where the second scheduling information is used to schedule an uplink time domain resource, and time domain resources scheduled by the second scheduling information of the at least one base station are different. The corresponding second scheduling information is sent to the at least one base station. In one embodiment, the centralized control device allocates, to the base stations, the scheduling information used to schedule an uplink time domain resource, so that time division uplink scheduling can be performed between the base stations, and a total power of uplink intra-frequency transmission does not exceed a maximum transmit power of the terminal device, to implement the uplink intra-frequency transmission.

In one embodiment, corresponding third scheduling information of the at least one base station is determined, where the third scheduling information is used to schedule a downlink resource, and DMRSs scheduled by the third scheduling information of the at least one base station are located in different CDM groups. The corresponding third scheduling information is sent to the at least one base station. In one embodiment, the centralized control device allocates, to the base stations, scheduling information used to schedule a downlink transmission resource, so that a DMRS of data scheduled by a plurality of TRPs can use different CDM groups, that is, time-frequency resources are orthogonal to each other, to ensure better performance of DMRS channel estimation.

According to a fifth aspect, an embodiment of this application provides a coordinated transmission method, where the method may be applied to a base station, or a chip or a chipset in the base station, and includes: receiving first scheduling information allocated by a control device to a first base station, where the first scheduling information is used to schedule an uplink frequency domain resource, and a frequency domain resource scheduled by the first scheduling information that is allocated by the control device to the first base station and a frequency domain resource scheduled by first scheduling information that is allocated by the control device to at least one second base station have at least one of the following relationships: frequency bands are completely the same, or the frequency bands are partially the same; and determining the uplink frequency domain resource based on the first scheduling information allocated by the control device to the first base station. In this embodiment of this application, a centralized control device allocates, to base stations, scheduling information used to schedule an uplink frequency domain resource, so that an association relationship can be established between the base stations.

In one embodiment, second scheduling information allocated by the control device to the first base station is received, where the second scheduling information is used to schedule an uplink time domain resource, and the second scheduling information allocated by the control device to the second base station is different from a time domain resource scheduled by second scheduling information that is allocated by the control device to the at least one second base station. The uplink time domain resource is determined based on the first scheduling information allocated by the control device to the first base station. In one embodiment, the centralized control device allocates, to the base stations, the scheduling information used to schedule an uplink time domain resource, so that time division uplink scheduling can be performed between the base stations, and a total power of uplink intra-frequency transmission does not exceed a maximum transmit power of the terminal device, to implement the uplink intra-frequency transmission.

In one embodiment, third scheduling information allocated by the control device to the first base station is received, where the third scheduling information is used to schedule an uplink time domain resource. A CDM group in which a DMRS scheduled by the third scheduling information that is allocated by the control device to the second base station is located is different from a CDM group in which a DMRS scheduled by the third scheduling information that is allocated by the control device to the at least one second base station is located. A CDM group in which a downlink scheduled DMRS is located is determined based on the third scheduling information allocated by the control device to the first base station. In one embodiment, the centralized control device allocates, to the base stations, the scheduling information used to schedule a downlink transmission resource, so that a DMRS of data scheduled by a plurality of TRPs can use different CDM groups, that is, time-frequency resources are orthogonal to each other, to ensure better performance of DMRS channel estimation.

According to a sixth aspect, an embodiment of this application provides a downlink transmission method, where the method may be used in a terminal device, or a chip or a chipset in the terminal device, and includes: receiving configuration information of a first serving cell from a base station, where the configuration information includes synchronization signal block (SS/PBCH block, SSB) configuration information of at least one second serving cell, and the second serving cell and the first serving cell have at least one of the following association relationships: operating frequency bands are completely the same, or the operating frequency bands are partially the same; and receiving downlink transmission of the second serving cell based on the SSB configuration information. According to this embodiment of this application, the terminal device may receive an SSB of another serving cell in a current serving cell, track a signal of the another serving cell, and then establish a relationship between a synchronization signal and a tracking signal of the another cell and a data channel, a channel state information reference signal (CSI-RS), or a control channel of the another cell, to more accurately receive the data channel, the CSI-RS, or the control channel from the another cell.

In one embodiment, the SSB configuration information includes an SSB index and a cell identifier. In one embodiment, the terminal device may determine, based on the cell identifier, a serving cell to which an SSB belongs, to accurately receive the SSB of the serving cell.

In one embodiment, the configuration information includes configuration information of at least one carrier, where the second serving cell sends the SSB on the at least one carrier. In one embodiment, the terminal device may determine, based on the configuration information of the carrier, the carrier on which the SSB is located, to accurately receive the SSB of the serving cell.

In one embodiment, the configuration information of the carrier includes at least one of frequency domain location information and a carrier identifier.

In one embodiment, the configuration information includes an SSB measurement time configuration, where the SSB measurement time configuration is used to indicate a time period in which an SSB of the first serving cell is detected, or indicate a time period in which an SSB of the second serving cell is detected. In one embodiment, the terminal device may determine, based on the SSB measurement time configuration, a time period in which the SSB of the serving cell is detected, to accurately receive the SSB of the serving cell.

According to a seventh aspect, an embodiment of this application provides a downlink transmission method, where the method may be applied to a base station, or a chip or a chipset in the base station, and includes: configuring an SSB for at least one second serving cell; and sending configuration information of a first serving cell to a terminal device. The configuration information includes SSB configuration information of the at least one second serving cell, and the second serving cell and the first serving cell have at least one of the following association relationships: operating frequency bands are completely the same, or the operating frequency bands are partially the same. In this embodiment of this application, the base station uses configuration information of a serving cell to carry synchronization signal block configuration information of a neighboring cell, so that the terminal device can receive an SSB of another serving cell in a current serving cell, trace a signal of the another serving cell, and then establish a relationship between a synchronization signal and a tracking signal of the another cell and a data channel, a CSI-RS, or a control channel of the another cell, to more accurately receive the data channel, the CSI-RS, or the control channel from the another cell.

In one embodiment, the SSB configuration information includes an SSB index and a cell identifier. In one embodiment, the terminal device may determine, based on the cell identifier, a serving cell to which an SSB belongs, to accurately receive the SSB of the serving cell.

In one embodiment, the configuration information includes configuration information of at least one carrier, where the second serving cell sends the SSB on the at least one carrier. In one embodiment, the terminal device may determine, based on the configuration information of the carrier, the carrier on which the SSB is located, to accurately receive the SSB of the serving cell.

In one embodiment, the configuration information of the carrier includes at least one of frequency domain location information and a carrier identifier.

In one embodiment, the configuration information includes an SSB measurement time configuration, where the SSB measurement time configuration is used to indicate a time period in which an SSB of the first serving cell is detected, or indicate a time period in which an SSB of the second serving cell is detected. In one embodiment, the terminal device may determine, based on the SSB measurement time configuration, a time period in which the SSB of the serving cell is detected, to accurately receive the SSB of the serving cell.

In one embodiment, when the SSB is configured for the at least one second serving cell, a quasi-co-located tracking reference signal may be configured for downlink transmission of the terminal device, and the SSB of the at least one second serving cell is configured based on the tracking reference signal, where the tracking reference signal is quasi-co-located with the SSB of the second serving cell. In one embodiment, the terminal device may establish, based on an SSB of the neighboring cell, the relationship between the synchronization signal and the tracking signal of the another cell and the data channel, the CSI-RS, or the control channel of the another cell, to more accurately receive the data channel, the CSI-RS, or the control channel from the another cell.

According to an eighth aspect, this application provides an uplink transmission apparatus. The apparatus may be a communication device, or may be a chip or a chipset in the communication device. The communication device may be a terminal device or may be a base station. The apparatus may include a processing module and a transceiver module. When the apparatus is a communication device, the processing module may be a processor, and the transceiver module may be a transceiver. The apparatus may further include a storage module, and the storage module may be a memory. The storage module is configured to store instructions, and the processing module executes the instructions stored in the storage module, so that the terminal device performs the corresponding function in the first aspect, or the processing module executes the instructions stored in the storage module, so that the base station performs the corresponding function in the second aspect. When the apparatus is a chip or a chipset in a communication device, the processing module may be a processor, a processing circuit, or a logic circuit, and the transceiver module may be an input/output interface, an interface circuit, an output circuit, an input circuit, a pin, a circuit, or the like. The processing module executes instructions stored in a storage module, so that the terminal device performs the corresponding function in the first aspect, or the processing module executes instructions stored in a storage module, so that the base station performs the corresponding function in the second aspect. The storage module may be a storage module (for example, a register or a cache) in the chip or the chipset, or may be a storage module (for example, a read-only memory or a random access memory) that is in the base station and that is located outside the chip or the chipset.

According to a ninth aspect, this application provides a coordinated transmission apparatus. The apparatus may be a base station, or may be a chip or a chipset in the base station. The apparatus may include a processing module and a transceiver module. When the apparatus is a base station, the processing module may be a processor, and the transceiver module may be a transceiver. The apparatus may further include a storage module, and the storage module may be a memory. The storage module is configured to store instructions, and the processing module executes the instructions stored in the storage module, so that the base station performs the corresponding functions in the third aspect to the fifth aspect. When the apparatus is a chip or a chipset in a base station, the processing module may be a processor, a processing circuit, or a logic circuit, and the transceiver module may be an input/output interface, an interface circuit, an output circuit, an input circuit, a pin, a circuit, or the like. The processing module executes instructions stored in a storage module, so that the base station performs the corresponding functions in the third aspect to the fifth aspect. The storage module may be a storage module (for example, a register or a cache) in the chip or the chipset, or may be a storage module (for example, a read-only memory or a random access memory) that is in the base station and that is located outside the chip or the chipset.

According to a tenth aspect, this application provides a downlink transmission apparatus. The apparatus may be a communication device, or may be a chip or a chipset in the communication device. The communication device may be a terminal device or may be a base station. The apparatus may include a processing module and a transceiver module. When the apparatus is a communication device, the processing module may be a processor, and the transceiver module may be a transceiver. The apparatus may further include a storage module, and the storage module may be a memory. The storage module is configured to store instructions, and the processing module executes the instructions stored in the storage module, so that the terminal device performs the corresponding function in the sixth aspect, or the processing module executes the instructions stored in the storage module, so that the base station performs the corresponding function in the seventh aspect. When the apparatus is a chip or a chipset in a communication device, the processing module may be a processor, a processing circuit, or a logic circuit, and the transceiver module may be an input/output interface, an interface circuit, an output circuit, an input circuit, a pin, a circuit, or the like. The processing module executes instructions stored in a storage module, so that the terminal device performs the corresponding function in the sixth aspect, or the processing module executes instructions stored in a storage module, so that the base station performs the corresponding function in the seventh aspect. The storage module may be a storage module (for example, a register or a cache) in the chip or the chipset, or may be a storage module (for example, a read-only memory or a random access memory) that is in the base station and that is located outside the chip or the chipset.

According to an eleventh aspect, an uplink transmission apparatus is provided, and includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the uplink transmission method according to the first aspect or any embodiment of the first aspect, and the second aspect or any embodiment of the second aspect.

According to a twelfth aspect, a coordinated transmission apparatus is provided, and includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the uplink transmission method according to the third aspect or any embodiment of the third aspect, the fourth aspect or any embodiment of the fourth aspect, and the fifth aspect or any embodiment of the fifth aspect.

According to a thirteenth aspect, an uplink transmission apparatus is provided, and includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the uplink transmission method according to the sixth aspect or any embodiment of the sixth aspect, and the seventh aspect or any embodiment of the seventh aspect.

According to a fourteenth aspect, an embodiment of this application provides a computer storage medium, where the computer storage medium stores program instructions. When the program instructions are run on a communication device, the communication device is enabled to perform the method in the first aspect and the embodiments of the first aspect, the second aspect and the embodiments of the second aspect, the third aspect and the embodiments of the third aspect, the fourth aspect and the embodiments of the fourth aspect, the fifth aspect and the embodiments of the fifth aspect, the sixth aspect and the embodiments of the sixth aspect, the seventh aspect and the embodiments of the seventh aspect, and the eighth aspect and the embodiments of the eighth aspect in embodiments of this application.

According to a fifteenth aspect, an embodiment of this application provides a computer program product. When the computer program product runs on a communication device, the communication device is enabled to perform the method in the first aspect and the embodiments of the first aspect, the second aspect and the embodiments of the second aspect, the third aspect and the embodiments of the third aspect, the fourth aspect and the embodiments of the fourth aspect, the fifth aspect and the embodiments of the fifth aspect, the sixth aspect and the embodiments of the sixth aspect, the seventh aspect and the embodiments of the seventh aspect, and the eighth aspect and the embodiments of the eighth aspect in embodiments of this application.

According to a sixteenth aspect, an embodiment of this application provides a chip, where the chip is coupled to a memory, and performs the method in the first aspect and the embodiments of the first aspect, the second aspect and the embodiments of the second aspect, the third aspect and the embodiments of the third aspect, the fourth aspect and the embodiments of the fourth aspect, the fifth aspect and the embodiments of the fifth aspect, the sixth aspect and the embodiments of the sixth aspect, the seventh aspect and the embodiments of the seventh aspect, and the eighth aspect and the embodiments of the eighth aspect in embodiments of this application.

According to a seventeenth aspect, an embodiment of this application provides a chip, including a communication interface and at least one processor, where the processor runs to perform the method in the first aspect and the embodiments of the first aspect, the second aspect and the embodiments of the second aspect, the third aspect and the embodiments of the third aspect, the fourth aspect and the embodiments of the fourth aspect, the fifth aspect and the embodiments of the fifth aspect, the sixth aspect and the embodiments of the sixth aspect, the seventh aspect and the embodiments of the seventh aspect, and the eighth aspect and the embodiments of the eighth aspect in embodiments of this application.

It should be noted that "coupling" in embodiments of this application indicates a direct combination or an indirect combination of two components.

DESCRIPTION OF EMBODIMENTS

Figure 1:
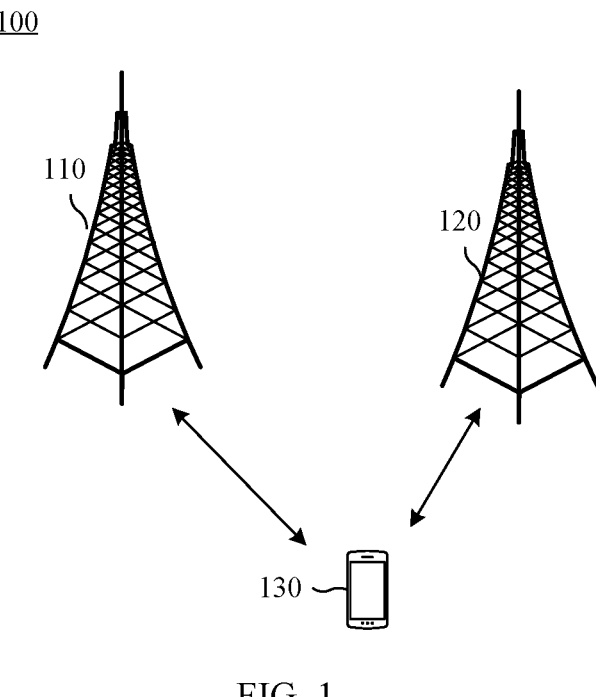
FIG. 1 is a schematic diagram of an architecture of a communication system according to an embodiment of this application.
Figures 2A, 2B, 2C, 2D:
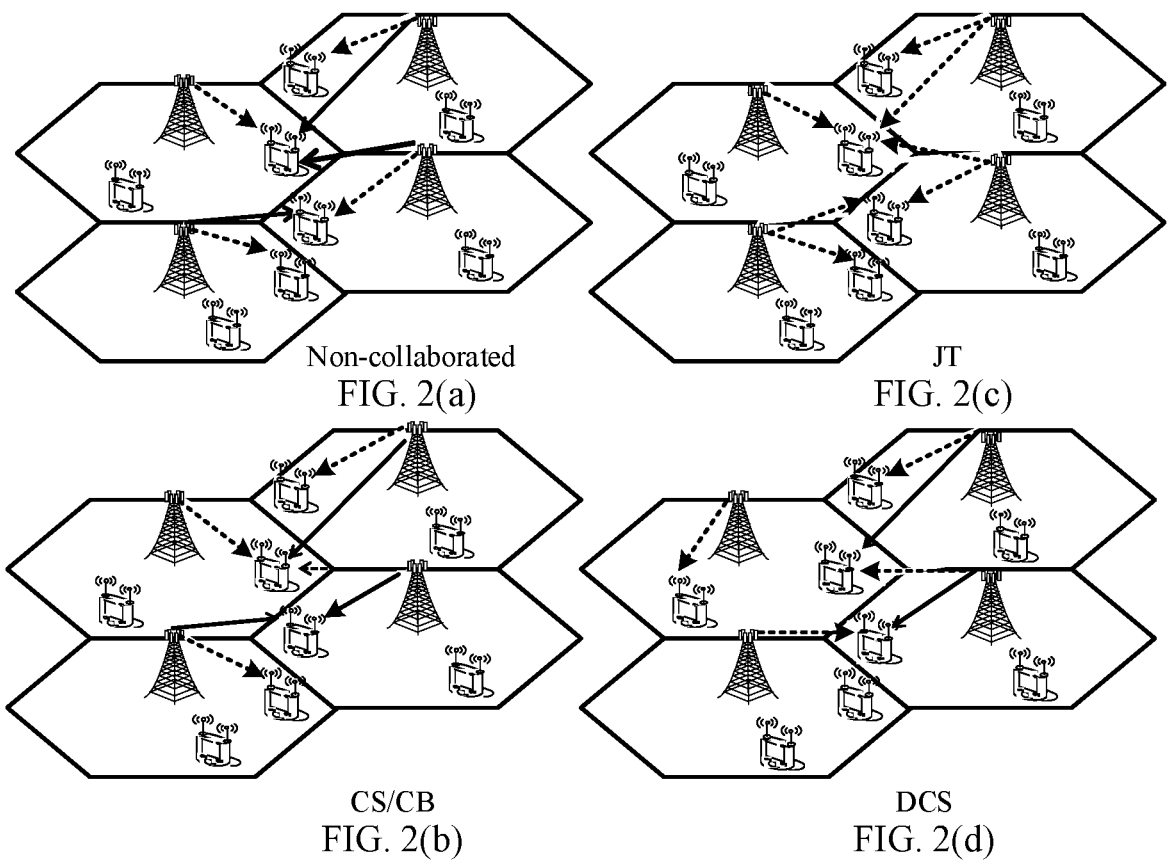
FIG. 2(*a*) to FIG. 2(*d*) are schematic diagrams of multi-TRP coordination according to an embodiment of this application.

To facilitate understanding of embodiments of this application, the following describes terms related to embodiments of this application.

1. Quasi-Collocation (QCL)

Quasi-colocation may also be referred to as quasi co-site or co-location.

Signals corresponding to antenna ports having a QCL relationship may have a same or similar spatial characteristic parameter (or referred to as a parameter), or a spatial characteristic parameter (or referred to as a parameter) of one antenna port may be used to determine a spatial characteristic parameter (or referred to as a parameter) of another antenna port that has a QCL relationship with the antenna port, or two antenna ports have a same or similar spatial characteristic parameter (or referred to as a parameter), or a difference between spatial characteristic parameters (or referred to as parameters) of two antenna ports is less than a threshold.

It should be understood that spatial characteristic parameters of two reference signals or channels that have a QCL relationship are the same (close or similar), so that a spatial characteristic parameter of a target reference signal can be inferred based on a resource index of a source reference signal.

It should be further understood that spatial characteristic parameters of two reference signals or channels that satisfy spatial relation information are the same (close or similar), so that the spatial characteristic parameter of the target reference signal can be inferred based on the resource index of the source reference signal.

The spatial characteristic parameter includes one or more of the following parameters: an angle of arrival (AoA), a dominant AoA, an average angle of arrival, a power angular spectrum (PAS) of the angle of arrival, an angle of departure (AoD), a dominant angle of departure, an average angle of departure, a power angular spectrum of the angle of departure, transmit beamforming of a terminal device, receive beamforming of the terminal device, spatial channel correlation, transmit beamforming of a network device, receive beamforming of the network device, an average channel gain, an average channel delay (average delay), a delay spread, a Doppler spread, a Doppler shift, spatial reception parameters (spatial Rx parameters), or the like.

The foregoing angles may be decomposition values at different dimensions or a combination of decomposition values at different dimensions.

Four types of QCL are defined in an existing standard, and the network device may simultaneously configure one or more types of QCL for the terminal device, for example, QCL types A+D, and QCL types C+D:

QCL type A: Doppler shift, Doppler spread, average delay, delay spread.

QCL type B: Doppler shift, Doppler spread.

QCL type C: average delay, Doppler shift.

QCL type D: spatial Rx parameter.

When the QCL relationship is QCL type D, the QCL relationship may be considered as spatial QCL. When the antenna ports have a spatial QCL relationship, the relationship may be a QCL relationship (which is referred to as a spatial relation) between a port for a downlink signal and another port for a downlink signal or between a port for an uplink signal and another port for an uplink signal: the two signals have a same AoA or AoD, which indicates that the two signals have a same receive beam or transmit beam. For another example, a QCL relationship between a downlink signal and an uplink signal or between a port for an uplink signal and a port for a downlink signal may be a correspondence between AoAs and AoDs of the two signals, or a correspondence between AoDs and AoAs of the two signals. In one embodiment, beam reciprocity may be used to determine an uplink transmit beam based on a downlink receive beam or determine the downlink receive beam based on the uplink transmit beam.

Signals transmitted on ports having the spatial QCL relationship may alternatively be understood as signals received or sent by using a same spatial filter. The spatial filter may be at least one of the following: precoding, a weight of an antenna port, a phase deflection of the antenna port, or an amplitude gain of the antenna port.

Signals transmitted on ports having the spatial QCL relationship may alternatively be understood as having corresponding beam pair links (BPLs). The corresponding BPLs include at least one of the following: a same downlink BPL, a same uplink BPL, an uplink BPL corresponding to a downlink BPL, or a downlink BPL corresponding to an uplink BPL.

Therefore, the spatial receive parameter (namely, QCL type D) may be understood as a parameter indicating direction information of a receive beam.

In an example of this application, correspondences of some parameters may also be used in descriptions of a QCL scenario.

It should be understood that, in a scenario applicable to a QCL assumption in this application, there may alternatively be an association relationship between two reference signals, or may further be an association relationship between transmission objects.

2. Transmission Configuration Indicator (TCI) State

A TCI indicates QCL information of a signal or a channel. The channel may be a physical downlink control channel (PDCCH)/control resource set (CORESET), or a physical downlink shared channel (PDSCH). The signal may be a channel state information reference signal (CSI-RS), a demodulation reference signal (DMRS), a tracking reference signal (TRS), or the like. TCI information indicates that a reference signal included in the TCI and the channel or the signal have a QCL relationship, which mainly indicates that during reception of the signal or the channel, information such as a spatial characteristic parameter of the signal or the channel is the same as, similar to, or approximate to information such as a spatial characteristic parameter of the reference signal included in the TCI.

One or more referenced reference signals and an associated QCL type may be configured for one TCI state. The QCL type may further be classified into type A, type B, type C, and type D that are different combinations or selections of {Doppler shift, Doppler spread, average delay, delay spread, spatial Rx parameter}. The TCI state includes QCL information, or the TCI state indicates QCL information.

3. Synchronization Signal Broadcast Channel Block (Synchronous Signal/PBCH Block or SS/PBCH Block)

An SS/PBCH block may also be referred to as an SSB. PBCH is an abbreviation of a physical broadcast channel. The SSB includes at least one of a primary synchronization signal (PSS), a secondary synchronization signal (SSS), and the PBCH. The SSB is a signal mainly used for cell searching, cell synchronization, and carrying broadcast information.

4. Concepts Related to Cells and Carriers

Component carrier (CC): A component carrier may alternatively be referred to as a component carrier, a component carrier, a component carrier, or the like. Each carrier in multi-carrier aggregation may be referred to as a "CC", includes one or more physical resource blocks (PRBs), and may have a corresponding PDCCH to schedule a PDSCH of the CC. Alternatively, some carriers do not have a PDCCH. In this case, cross-carrier scheduling may be performed on the carriers. That is, a PDCCH of one CC schedules a PDSCH of another CC. The terminal device may receive data on a plurality of CCs.

Carrier aggregation (CA): Carrier aggregation may refer to aggregation of a plurality of continuous or non-continuous component carriers into a larger bandwidth.

Primary cell/primary serving cell (PCell): A primary cell/primary serving cell is a cell on which CA UE camps. Usually, only the PCell has a physical uplink control channel (PUCCH).

Primary secondary cell (PSCell): A PSCell is a special secondary cell that is on a secondary eNodeB (SeNB) and configured by a master eNodeB (MeNB) to DC UE via RRC connection signaling.

Secondary cell (SCell): An SCell is a cell configured for a CA terminal device via RRC connection signaling, works on an SCC (secondary carrier), and can provide the CA terminal device with more radio resources. In the SCell, there may be only downlink transmission or both uplink and downlink transmission.

Special cell (SpCell): In a dual connectivity (DC) scenario, a SpCell is a PCell of a master cell group (MCG) or a PSCell of a secondary cell group (SCG). Otherwise, for example, in a CA scenario, a SpCell refers to a PCell.

MCG/SCG: An MCG indicates a master cell group, a group to which a cell that provides a service for a terminal device and that is served by a master base station belongs. In a dual connectivity mode, a group of serving cells associated with the MeNB include a PCell and one or more SCells.

An SCG indicates a secondary cell group, a group to which a cell that provides a service for UE and that is served by a secondary base station belongs. In the dual connectivity mode, the SCG includes a PSCell, or includes a PSCell and at least one SCell.

MeNB/SeNB: An MeNB is a base station that serves a cell on which a DC terminal device camps. An SeNB is another base station configured by the MeNB for the DC UE via RRC connection signaling.

It should be noted that, with continuous development of technologies, the terms in embodiments of this application may change, but all of them shall fall within the protection scope of this application.

To make objectives, technical solutions, and advantages of embodiments of this application clearer, the following further describes embodiments of this application in detail with reference to the accompanying drawings.

A communication method provided in this application may be used in various communication systems, for example, an Internet of Things (IoT), a narrowband Internet of Things (NB-IoT), a long term evolution (LTE), a fifth generation (5G) communication system, an LTE and 5G hybrid architecture, a 5G NR system, or a new communication system emerging in future communication development. The 5G communication system in this application may include at least one of a non-standalone (NSA) 5G communication system and a standalone (SA) 5G communication system. The communication system may alternatively be a public land mobile network (PLMN), a device-to-device (D2D) network, a machine-to-machine (M2M) network, or another network.

FIG. 1 shows a communication system 100 applicable to an embodiment of this application. The communication system 100 is in a dual connectivity (DC) or CoMP scenario. The communication system 100 includes a network device 110, a network device 120, and a terminal device 130. The network device 110 may be a network device initially accessed by the terminal device 130, and is responsible for RRC communication with the terminal device 130. The network device 120 is added during RRC reconfiguration, and is configured to provide additional radio resources. The terminal device 130 on which CA is configured is connected to the network device 110 and the network device 120. A link between the network device 110 and the terminal device 130 may be referred to as a first link, and a link between the network device 120 and the terminal device 130 may be referred to as a second link.

The communication system applicable to the embodiment of this application is merely an example for description, and is not limited thereto. For example, another quantity of network devices and terminal devices may alternatively be included in the communication system, or a single base station and multi-carrier aggregation scenario, a dual connectivity scenario, a D2D communication scenario, or a CoMP scenario may be used. CoMP may be one or more of a non-coherent joint transmission (NCJT) scenario, a coherent joint transmission (CJT) scenario, a joint transmission (JT) scenario, or the like.

The terminal device in embodiments of this application is an entity configured to receive or transmit a signal on a user side. The terminal device may be a device that provides voice/data connectivity for a user, for example, a handheld device or a vehicle-mounted device that has a wireless connection function. The terminal device may alternatively be another processing device connected to a wireless modem. The terminal device may communicate with one or more core networks through a radio access network (RAN). The terminal device may also be referred to as a wireless terminal, a subscriber unit, a subscriber station, a mobile station, a remote station, an access point, a remote terminal, an access terminal, a user terminal, a user agent, a user device, user equipment, or the like. The terminal device may be a mobile terminal, for example, a mobile phone (or referred to as a "cellular" phone), and a computer that has a mobile terminal. For example, the terminal device may be a portable, pocket-sized, handheld, computer built-in, or vehicle-mounted mobile apparatus, which exchanges voices and data with the radio access network. For example, the terminal device may alternatively be a device, for example, a personal communication service (PCS) phone, a cordless telephone set, a Session Initiation Protocol (SIP) phone, a wireless local loop (WLL) station, or a personal digital assistant (PDA). For example, common terminal devices include a mobile phone, a tablet computer, a notebook computer, a palmtop computer, a mobile Internet device (MID), and a wearable device such as a smartwatch, a smart band, or a pedometer. However, embodiments of this application are not limited thereto. The terminal device in embodiments of this application may alternatively be a terminal device or the like appearing in a future evolved PLMN. This is not limited in embodiments of this application.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrowband (NB) technology.

In addition, in embodiments of this application, the terminal device may further include a sensor, for example, an intelligent printer, a train detector, or a gas station. Main functions of the terminal device include collecting data (by some terminal devices), receiving control information and downlink data from a network device, sending an electromagnetic wave, and sending uplink data to a network device.

The network device in embodiments of this application is an entity that is on a network side and configured to transmit or receive a signal, and may be configured to perform mutual conversion between a received over-the-air frame and Internet Protocol (IP) packet, and serve as a router between the terminal device and the rest of an access network. The network device may further coordinate attribute management of an air interface. The network device in embodiments of this application may be a device in a wireless network, for example, a RAN node that connects a terminal to the wireless network. For example, the network device may be an evolved NodeB (evolutional NodeB, eNB, or e-NodeB) in LTE, a new radio controller (NR controller), a gNodeB (gNB) in a 5G system, a centralized unit (CU), a new wireless base station, a remote radio unit, a micro base station, a relay, a distributed unit (DU), a home base station, a transmission reception point (TRP), a transmission point (TP), or any other radio access device. In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implementing functions of the radio resource control (RRC) layer and the Packet Data Convergence Protocol (PDCP) layer. The DU is responsible for processing a physical layer protocol and a real-time service, and implements functions of the Radio Link Control (RLC) layer, the Media Access Control (MAC) layer, and the physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or may be classified into a network device in a core network (CN). This is not limited in this application. The network device may cover one or more cells.

The network architecture and the service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

In a modern communication system, to improve spectrum utilization, intra-frequency deployment is usually used. That is, a plurality of cells in a network may be deployed on a same frequency band. In this case, the terminal device may receive signals from a plurality of cells. When the terminal device is located in an edge area, the terminal device may be interfered with signals from a neighboring cell other than a current cell. As a result, a channel condition is poor. CoMP is widely used to resolve interference between the cells and improve user data rates.

The network device performs coordination by exchanging information, so that interference can be effectively avoided and the rates can be improved. A plurality of TRPs may provide the terminal device with a downlink service through coordination, or may receive an uplink signal of the terminal device through coordination. Coordination technologies mainly include JT, dynamic cell/point selection (DCS/DPS), coordinated interference/scheduling (CB/CS), and the like. As shown in FIG. 2(a) to FIG. 2(d), an arrow in a solid line represents interference generated to a terminal device, and an arrow in a dashed line represents useful data generated for a terminal device. In a non-coordinated scenario, an edge terminal device receives a signal of a current cell, and is interfered by a neighboring cell. In a JT technology, a plurality of cells jointly send data to the terminal device, and the terminal device receives a plurality pieces of useful data. Therefore, a transmission rate can be increased. In a CSCB technology, interference from a neighboring cell is coordinated. For example, a to-be-sent signal in the neighboring cell may be adjusted to avoid being sent to the terminal device in a strong interference direction, thereby reducing an interference level of the terminal device. In a DPS/DCS technology, a network dynamically selects a better transmission reception point to serve the terminal device, so that the terminal device can ensure being under a stronger cell signal. In this case, a weaker cell signal becomes interference. A difference in channels of a plurality of TRPs can improve a signal to interference plus noise ratio of the terminal device.

Figure 3:
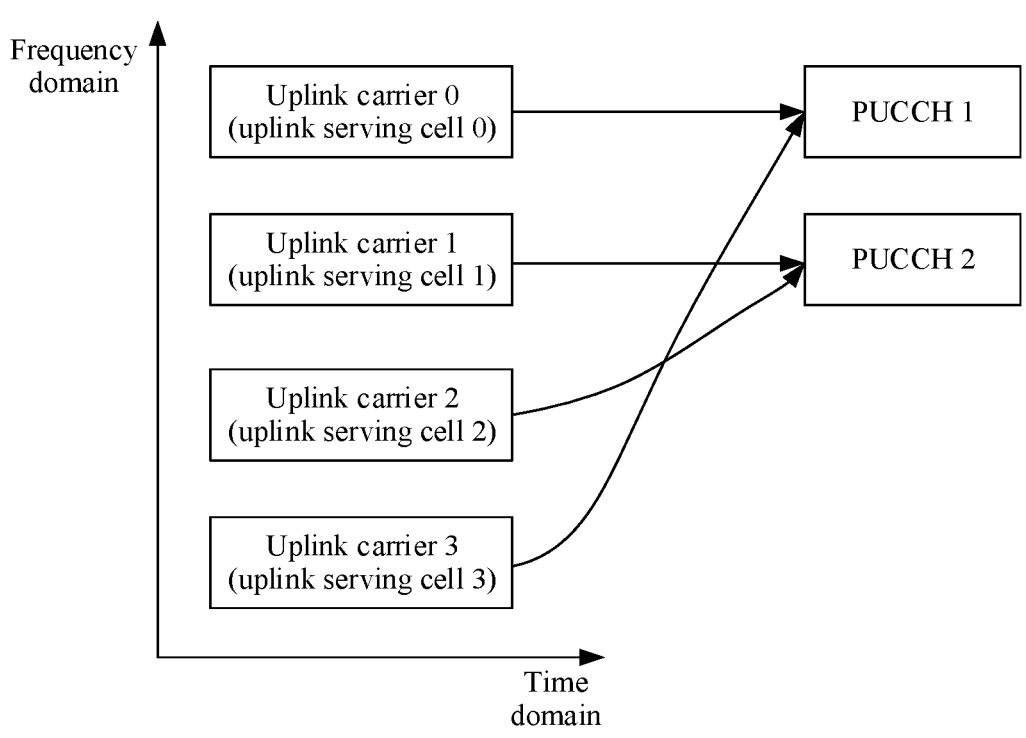
FIG. 3 is a schematic diagram of CA-based uplink transmission according to an embodiment of this application.

When a plurality of TRPs coordinate to provide an uplink service for the terminal device, the terminal device may simultaneously transmit uplink signals to the plurality of TRPs. Currently, the terminal device may simultaneously transmit uplink signals to a plurality of network devices by using a CA technology. The terminal device may be configured with a plurality of carriers to perform uplink and downlink data communication. A PUCCH is used as an example. A plurality of carriers that can be used to transmit the PUCCH may be configured for the terminal device. For example, a PUCCH may be configured for the terminal device in a PCell, and a PUCCH may be configured for the terminal device in an additional SCell. As shown in FIG. 3, the terminal device may be configured to send a PUCCH 1 on an uplink carrier 0 (or referred to as an uplink serving cell 0) and an uplink carrier 3 (or referred to as an uplink serving cell 3) at the same time, and send a PUCCH 2 on an uplink carrier 1 (or referred to as an uplink serving cell 1) and an uplink carrier 2 (or referred to as an uplink serving cell 2) at the same time.

Currently, CA mainly supports inter-frequency transmission and does not support intra-frequency transmission, for example, intra-frequency downlink scheduling and intra-frequency uplink transmission. Therefore, currently, there is no available solution to how the terminal device performs intra-frequency uplink transmission on a plurality of intra-frequency deployed TPRs.

In view of this, embodiments of this application provide an uplink transmission method and apparatus, a downlink transmission method and apparatus, and a coordinated transmission method and apparatus, so that the terminal device can perform intra-frequency transmission on the plurality of intra-frequency deployed TPRs. The method and the apparatus are based on a same inventive idea. Because problem-resolving principles of the method and the apparatus are similar, apparatus embodiments and method embodiments may be mutually referenced. Repeated parts are not described.

In embodiments of this application, a time domain/time unit may be a frame, a radio frame, a system frame, a subframe, a half frame, a slot, a mini-slot, a symbol, or the like. Data may be a codeword, a transport block, a code block, or a code block group.

It should be understood that, in embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "I" usually indicates an "or" relationship between the associated objects. "At least one (piece) of the following" or a similar expression thereof means any combination of these items, including any combination of singular items (pieces) or plural items (pieces). For example, at least one (piece) of a, b, or c may indicate a, b, c, a and b, a and c, b and c, or a, b, and c, where a, b, and c may be singular or plural.

In addition, it should be understood that in descriptions of this application, terms such as "first" and "second" are merely intended for purposes of description, shall not be understood as an indication or implication of relative importance, shall not be understood as an indication or implication of a sequence, and shall not be understood as a number.

The following further illustrates the methods provided in embodiments of this application in detail with reference to the accompanying drawings.

Figure 4:
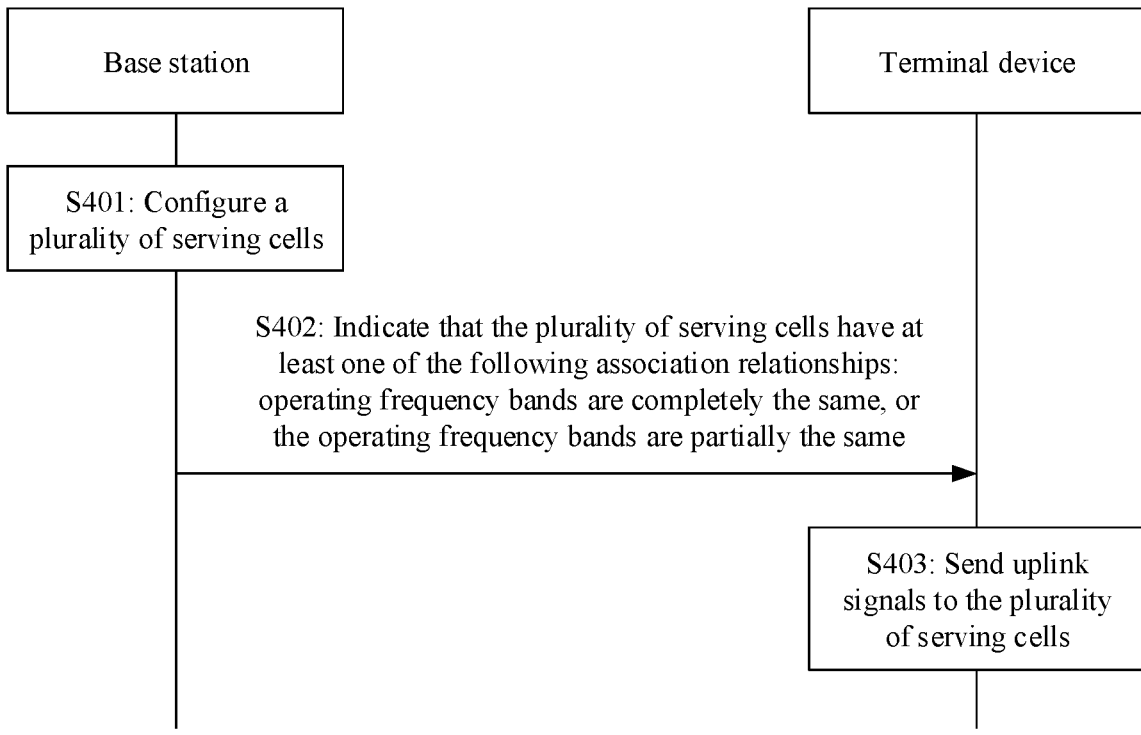
FIG. 4 is a schematic flowchart of an uplink transmission method according to an embodiment of this application.

Embodiment 1: FIG. 4 is a flowchart of an uplink transmission method according to this application. The method may be used in a communication device, a chip, a chipset, or the like. The following uses a communication device as an example for description. The method includes the following operations.

S401: A base station configures a plurality of serving cells for a terminal device, where the plurality of serving cells have at least one of the following association relationships: operating frequency bands are completely the same, or the operating frequency bands are partially the same.

The plurality of serving cells may belong to different TRPs. Physical cell identifiers of the plurality of serving cells may be the same or may be different.

For example, the base station may configure five serving cells for the terminal device, and center frequencies and bandwidths of the five serving cells are the same. Therefore, it may be considered that the five serving cells have an association relationship. Alternatively, center frequencies of the five serving cells are the same but bandwidths of the five serving cells are different. Therefore, some operating frequency bands of the five serving cells overlap, and it may be considered that the five serving cells have an association relationship. Alternatively, center frequencies and bandwidths of the five serving cells are different, but operating frequency bands of the five serving cells partially overlap. Therefore, it may be considered that the five serving cells have an association relationship.

S402: The base station indicates, to the terminal device, that the plurality of serving cells have at least one of the following association relationships: the operating frequency bands are completely the same, or the operating frequency bands are partially the same. Correspondingly, the terminal device may determine the plurality of serving cells based on an instruction of the base station.

It should be noted that the configuration of the plurality of serving cells in S401 and the indication of the association relationship in S402 may be sent together or separately. That is, S401 and S402 may be separate operations, or may be a same communication operation.

In one embodiment, the base station may send indication information to the terminal device, where the indication is used to indicate that the plurality of serving cells have at least one of the following association relationships: the operating frequency bands are completely the same, or the operating frequency bands are partially the same. Correspondingly, the terminal device may determine the plurality of serving cells based on the indication information.

In some embodiments, the indication information may be carried in configuration information of a serving cell to be sent to the terminal device. For example, the base station configures N serving cells for the terminal device, and uses configuration information of a serving cell 1 to carry the indication information, where the indication information is used to indicate that serving cells 2 to N have an association relationship with the serving cell 1. For another example, the base station configures N serving cells for the terminal device, and uses configuration information of serving cells 2 to N to carry the indication information, where the indication information carried in the configuration information of each of the serving cells 2 to N is used to indicate that the serving cell has an association relationship with the serving cell 1.

In some other embodiments, the base station may alternatively configure, for the terminal device, a list of serving cells having an association relationship. It may be understood that the base station sends one piece of configuration information to the terminal device, where the configuration information is used to indicate that the plurality of serving cells have an association relationship. For example, the base station may send the list shown in Table 1 to the terminal device.

TABLE 1

| Serving cell | Associated cell |
| --- | --- |
| X1 | X2, X2, X3 |
| Y2 | Y1, Y3, Y4, Y5 |
| . . . | . . . |

In Table 1, it may be indicated that cells X2, X3, and X4 have an association relationship with a cell X1, and cells Y1, Y3, Y4, and Y5 have an association relationship with a cell Y2. Therefore, the terminal device may determine, based on Table 1, that cells X1 to X4 have the association relationship, and cells Y1 to Y5 have the association relationship.

In an example, in the indication information, a serving cell may be identified by using a serving cell number, a physical cell number of the serving cell, or the like.

In one embodiment, the base station may indicate the plurality of serving cells to the terminal device by using configuration information. Therefore, the terminal device may determine the plurality of serving cells based on the configuration information of the plurality of serving cells from the base station.

In an example, the base station may indicate the plurality of serving cells by using frequency domain configuration information of each serving cell.

In an example, the base station may indicate the plurality of serving cells by using downlink frequency domain configuration information of each serving cell. For example, the downlink frequency domain configuration information may include, but is not limited to, an absolute radio frequency channel number (ARFCN) value of an SSB, frequency band information used to indicate a frequency band of the serving cell, an absolute frequency domain location (which may also be referred to as a point A) whose public RB identifier is 0, a bandwidth, a carrier location configuration, configuration information (for example, a start location and bandwidth of a BWP) of a bandwidth part (BWP), and the like.

For example, the base station may configure a same downlink ARFCN for a plurality of serving cells, so that after the terminal device receives the configuration information of each serving cell, it may be considered that the serving cells having the same downlink ARFCN have an association relationship. In one embodiment, an action in which the base station sends the configuration information of the plurality of serving cells to the terminal device may be understood as that the base station indicates the plurality of serving cells to the terminal device. Alternatively, it may be understood that operation S402 is not performed. The base station sends the configuration information of the plurality of serving cells to the terminal device, and terminal device determines, based on the configuration information of the plurality of serving cells, that the plurality of cells have an association relationship.

For another example, the base station may configure, through BWP configuration, downlink frequency domain locations of the plurality of serving cells with a partially overlapping frequency band. Therefore, after the terminal device receives the configuration information of each serving cell, it may be considered that serving cells whose downlink frequency domain locations have an overlapping frequency band have an association relationship. For example, if a downlink BWP 1 and a downlink BWP 2 are configured for the serving cell 1, a downlink BWP 1 is configured for the serving cell 2, and the two BWPs 1 are completely the same, the serving cell 1 and the serving cell 2 have an association relationship. For another example, if a downlink BWP 1 and a downlink BWP 2 are configured for the serving cell 1, a downlink BWP 1 and a downlink BWP 3 are configured for the serving cell 2, and the two BWPs 1 are completely the same, the serving cell 1 and the serving cell 2 have an association relationship. For still another example, if a downlink BWP 1 is configured for the serving cell 1, a downlink BWP 1 is configured for the serving cell 2, and the two BWPs 1 are completely the same, the serving cell 1 and the serving cell 2 have an association relationship.

For still another example, the base station may configure a same downlink point A for a plurality of serving cells, so that after the terminal device receives the configuration information of each serving cell, it may be considered that the serving cells having the same downlink point A have an association relationship.

In another example, the base station may indicate the plurality of serving cells by using uplink frequency domain configuration information of each serving cell. For example, the uplink frequency domain configuration information may include but is not limited to frequency band information used to indicate an uplink frequency band of the serving cell, a point A, a carrier location configuration, an indication of whether to offset a preset offset value (for example, 7.5 Hz), a bandwidth, configuration information (for example, a start position and a bandwidth of a BWP) of the BWP, and the like.

For example, the base station may configure a same uplink ARFCN for a plurality of serving cells, so that after the terminal device receives the configuration information of each serving cell, it may be considered that the serving cells having the same uplink ARFCN have an association relationship.

For another example, the base station may configure, through BWP configuration, uplink frequency domain locations of the plurality of serving cells with a partially overlapping frequency band. Therefore, after the terminal device receives the configuration information of each serving cell, it may be considered that serving cells whose uplink frequency domain locations have an overlapping frequency band have an association relationship. For example, if an uplink BWP 1 and an uplink BWP 2 are configured for the serving cell 1, an uplink BWP 1 is configured for the serving cell 2, and the two BWPs 1 are completely the same, the serving cell 1 and the serving cell 2 have an association relationship. For another example, if an uplink BWP 1 and an uplink BWP 2 are configured for the serving cell 1, an uplink BWP 1 and an uplink BWP 3 are configured for the serving cell 2, and the two BWPs 1 are completely the same, the serving cell 1 and the serving cell 2 have an association relationship. For still another example, if an uplink BWP 1 is configured for the serving cell 1, an uplink BWP 1 is configured for the serving cell 2, and the two BWPs 1 are completely the same, the serving cell 1 and the serving cell 2 have an association relationship.

For still another example, the base station may configure a same uplink point A for a plurality of serving cells, so that after the terminal device receives the configuration information of each serving cell, it may be considered that the serving cells having the same uplink point A have an association relationship.

In one embodiment, the base station may configure the plurality of serving cells in a time division duplexing (TDD) manner. Uplink and downlink frequency bands of the plurality of serving cells configured in the TDD manner may be the same. Therefore, uplink and downlink frequency domain locations of the plurality of serving cells are aligned. Therefore, after receiving the configuration information of the plurality of serving cells, when determining that the plurality of serving cells are configured in the TDD manner, the terminal device may determine that the plurality of serving cells have an association relationship.

In one embodiment, the base station may configure the plurality of serving cells in a frequency division duplexing (FDD) manner, and configure uplink frequency domain resources of the plurality of serving cells with an overlapping frequency band, where frequency bands of the uplink frequency domain resources may completely overlap, or may partially overlap. Uplink and downlink frequency bands of the plurality of serving cells in the FDD manner are different, and the uplink frequency domain resources of the plurality of serving cells are configured with an overlapping frequency band. Therefore, after receiving the configuration information of the plurality of serving cells, when determining that the plurality of serving cells are configured in the FDD manner and the uplink frequency domain resources have the overlapping frequency band, the terminal device determines that the plurality of serving cells have an association relationship. In one embodiment, downlink frequency domain resources of the plurality of serving cells may have an overlapping frequency band, or may have no overlapping frequency band.

Completely overlapping is used as an example. The base station may configure the plurality of serving cells in a frequency division duplexing (FDD) manner, and uplink frequency domain configurations of the plurality of serving cells are the same. Therefore, after receiving the configuration information of the plurality of serving cells, when determining that the plurality of serving cells are configured in the FDD manner and the uplink frequency domain configurations are the same, the terminal device determines that the plurality of serving cells have an association relationship. In one embodiment, downlink frequency domain configurations of the plurality of serving cells may be the same or may be different.

In one embodiment, the base station may configure the plurality of serving cells in the FDD manner, and configure downlink frequency domain resources of the plurality of serving cells with an overlapping frequency band, where frequency bands of the downlink frequency domain resources may completely overlap, or may partially overlap. Uplink and downlink frequency bands of the plurality of serving cells configured in the FDD manner are different, and the downlink frequency domain resources of the plurality of serving cells are configured with an overlapping frequency band. Therefore, after receiving the configuration information of the plurality of serving cells, when determining that the plurality of serving cells are configured in the FDD manner and the downlink frequency domain resources have the overlapping frequency band, the terminal device determines that the plurality of serving cells have an association relationship. In one embodiment, uplink frequency domain resources of the plurality of serving cells may have an overlapping frequency band, or may have no overlapping frequency band.

Completely overlapping is used as an example. The base station may configure the plurality of serving cells in a frequency division duplexing (FDD) manner, and downlink frequency domain configurations of the plurality of serving cells are the same. Therefore, after receiving the configuration information of the plurality of serving cells, when determining that the plurality of serving cells are configured in the FDD manner and the downlink frequency domain configurations are the same, the terminal device determines that the plurality of serving cells have an association relationship. In one embodiment, the uplink frequency domain configurations of the plurality of serving cells may be the same or may be different.

In another example, the base station may indicate the plurality of serving cells by using a physical cell identifier of each serving cell. For example, the base station configures physical cell identifiers (physical cell IDs, PCIs) of a plurality of serving cells to be the same, and sends configuration information of the plurality of serving cells to the terminal device, where the physical cell identifiers carried in configuration information of the plurality of serving cells are the same. In this way, the terminal device receives the configuration information of each serving cell, and may consider the serving cells with the same physical cell identifier as having an association relationship.

In one embodiment, when establishing an association relationship between the plurality of serving cells, the base station may specify one serving cell, and another serving cell associated with the serving cell is configured in a supplementary manner. The specified serving cell may mainly provide a service for the terminal device, and the associated cell may assist the specified serving cell in providing the service for the terminal device. For example, some common parameters may be carried in configuration information of the specified serving cell, and only some parameters are configured in the serving cell associated with the specified serving cell. Alternatively, a common parameter may be configured in the associated serving cell, but the common parameter may not take effect. The terminal device determines configuration of the common parameter based on configuration information of the specified serving cell.

For example, the common parameter may be but is not limited to at least one of the following parameters: a DMRS type A (type A) location, rate matching pattern configuration information, a subcarrier spacing of an SSB, configuration information of an uplink-downlink frame structure, a timing advance group identifier, carrier switching configuration information, and the like. The configuration information of the uplink-downlink frame structure is used to indicate a slot that can be used for uplink transmission and a slot that can be used for downlink transmission.

In addition, frequency domain configuration information of a serving cell may also be a common parameter. In this manner, cells that use the common parameter may have an association relationship.

S403: The terminal device sends uplink signals to the plurality of serving cells, where the sending of the uplink signal meets a preset condition.

In an example, the preset condition may include at least one of the following.

A total power of the uplink signals of the plurality of serving cells is less than or equal to (or is less than) a maximum transmit power of the terminal device. It may also be understood as that the total power of the uplink signals of the plurality of serving cells is less than or equal to the maximum transmit power of the terminal device. That is, the total power of the uplink signals of the plurality of serving cells is not greater than the maximum transmit power of the terminal device. For example, it is assumed that the serving cells 1 to 3 have an association relationship. A sum of a power of the uplink signal of the serving cell 1, a power of the uplink signal of the serving cell 2, and a power of the uplink signal of the serving cell 3 is less than or equal to the maximum transmit power of the terminal device, or a sum of a power of the uplink signal of the serving cell 1, a power of the uplink signal of the serving cell 2, and a power of the uplink signal of the serving cell 3 is less than the maximum transmit power of the terminal device.

A total power of the uplink signals of the plurality of serving cells is less than or equal to (or is less than) a maximum transmit power of the terminal device on an overlapping frequency band. It may also be understood as that the total power of the uplink signals of the plurality of serving cells is less than or equal to the maximum transmit power of the terminal device on the overlapping frequency band. That is, the total power of the uplink signals of the plurality of serving cells is not greater than the maximum transmit power of the terminal device on the overlapping frequency band. The overlapping frequency band is an overlapping part of the operating frequency bands of the plurality of serving cells. For example, it is assumed that the serving cells 1 to 3 have an association relationship. A sum of a power of the uplink signal of the serving cell 1, a power of the uplink signal of the serving cell 2, and a power of the uplink signal of the serving cell 3 is less than or equal to the maximum transmit power of the terminal device on the overlapping frequency band, or a sum of a power of the uplink signal of the serving cell 1, a power of the uplink signal of the serving cell 2, and a power of the uplink signal of the serving cell 3 is less than the maximum transmit power of the terminal device on the overlapping frequency band.

A power of the uplink signal of any one of the plurality of serving cells is less than or equal to (or is less than) a maximum transmit power of the terminal device in the any serving cell. It may be understood that the power of the uplink signal of any serving cell is less than or equal to the maximum transmit power of the terminal device in the any serving cell. That is, the power of the uplink signal of any serving cell is not greater than the maximum transmit power of the terminal device in the any serving cell. For example, it is assumed that the serving cells 1 to 3 have an association relationship. A power of the uplink signal of the serving cell 1 is less than or equal to (or is less than) a maximum transmit power of the terminal device in the serving cell 1. A power of the uplink signal of the serving cell 2 is less than or equal to (or is less than) a maximum transmit power of the terminal device in the serving cell 2. A power of the uplink signal of the serving cell 3 is less than or equal to (or is less than) a maximum transmit power of the terminal device in the serving cell 3.

In one embodiment, if the sending of the uplink signal by the terminal device does not meet the preset condition, the terminal device performs power back-off on a power of the uplink signal of at least one of the plurality of serving cells.

Power back-off is to multiply a transmit power of each of signals with a same priority by a uniform factor (which may be referred to as a scale factor), to ensure that an obtained power does not exceed a maximum transmit power. If there are signals with different priorities, transmission of a signal with a higher priority is ensured first. That is, a part of a total power is allocated to the signal with a higher priority first. The rest of the signals with a lower priority need to meet a condition of the rest of the total power, and the rest of the total power may be multiplied by an equal scale factor. Further, when performing power back-off on the power of the uplink signal of at least one of the plurality of serving cells, the terminal device may perform power back-off on the power of the uplink signal of at least one serving cell based on priorities of the plurality of serving cells. For example, the terminal device may perform power back-off on a serving cell whose priority is less than a priority threshold. Alternatively, the terminal device may perform power back-off of a first amplitude on a serving cell whose priority is less than the priority threshold, and perform power back-off of a second amplitude on a serving cell whose priority is greater than or equal to the priority threshold, where the first amplitude is greater than the second amplitude.

For example, the terminal device may determine priorities of the serving cells based on a transmission status of uplink data. For example, a priority of a serving cell with to-be-sent uplink data is relatively high, and a priority of a serving cell without to-be-sent uplink data is relatively low.

Alternatively, the terminal device may determine priorities of the serving cells based on importance of the serving cells. For example, a priority of a primary serving cell is relatively high, and a priority of a serving cell associated with the primary serving cell is relatively low.

In one embodiment, the terminal device may determine a transmit power headroom (power headroom report, PHR) based on the total power of the uplink signals of the plurality of serving cells. For example, the base station configures, for the terminal device, a PCell, an SCell 1, and an SCell 2 that have an association relationship. When calculating a PHR of the PCell, the terminal device may subtract a power of a PUCCH in the SCell 1 and a power of a PUCCH in the SCell 2 from a maximum power of the PCell.

Alternatively, a power headroom is obtained by subtracting a total power (for example, a power of a PUCCH and a power of a PUSCH) of uplink signals sent by all associated serving cells on a frequency band (an overlapping frequency band) from a maximum power of the frequency band. The subtraction here is addition and subtraction operations of a dB value, that is, a division operation of a linear value.

In another example, the preset condition may further be that the uplink signals are sent to the plurality of serving cells in a time division manner. In the time division manner, it may be understood that time domain resources of the sent uplink signals do not overlap.

From a perspective of the terminal device, the terminal device does not expect to be configured or indicated to send uplink signals (for example, PUCCHs) in a plurality of associated serving cells at the same time. From a perspective of base stations, the base stations coordinate time for transmitting uplink signals, to ensure scheduling time division in associated serving cells.

When the base stations coordinate the time for transmitting uplink signals, each base station may send resource information for uplink scheduling, for example, time domain information occupied by uplink scheduling, to another base station. Each base station determines, based on the resource information for uplink scheduling of the another base station, scheduling information to be used by the base station. Alternatively, a control device (for example, a centralized scheduling base station) may be responsible for allocating a time domain resource for uplink scheduling of each base station. After the control device allocates the time domain resource for uplink scheduling to each base station, each base station may be notified of the time domain resource that can be used for uplink scheduling.

In this embodiment of this application, the base station indicates the plurality of serving cells that have the association relationship to the terminal device, so that the terminal device can perform joint power control on the plurality of serving cells that have the association relationship, and a total power of uplink intra-frequency transmission does not exceed a maximum transmit power of the terminal device. In this way, the terminal device can perform uplink transmission on a same frequency band for the plurality of serving cells.

In addition, the terminal device may perform PHR reporting for the plurality of serving cells that have the association relationship, so that the base station may perform resource scheduling for reported PHRs, to improve resource scheduling accuracy.

In one embodiment, if PDSCHs of the plurality of serving cells partially or completely overlap in time domain, the plurality of serving cells may meet at least one of the following conditions when downlink transmission is performed.

Condition 1: The PDSCHs of the plurality of serving cells have at least one of a same actual quantity of front-loaded DMRS symbols, a same actual quantity of additional DMRSs, a same actual DMRS symbol location, and a same DMRS configuration type.

Condition 2: The PDSCHs of the plurality of serving cells are separately scheduled by different PDCCHs, where the PDCCH may indicate a DMRS port, a TCI state, and the like of the PDSCH, and the TCI state is associated with the DMRS port. If different PDCCHs indicate different TCI states, DMRSs of PDSCHs scheduled by different PDCCHs belong to different CDM groups.

Condition 3: Active BWPs of different serving cells should completely overlap, where subcarrier spacings of the BWPs may be the same.

Condition 4: Different PDSCHs have a same mapping type.

Condition 5: Different precoding resource block groups (precoding resource block group, PRG) have a same granularity and location.

Condition 6: Different physical resource block groups (resource block group, RBG) have a same granularity and location.

Figures 5, 6:
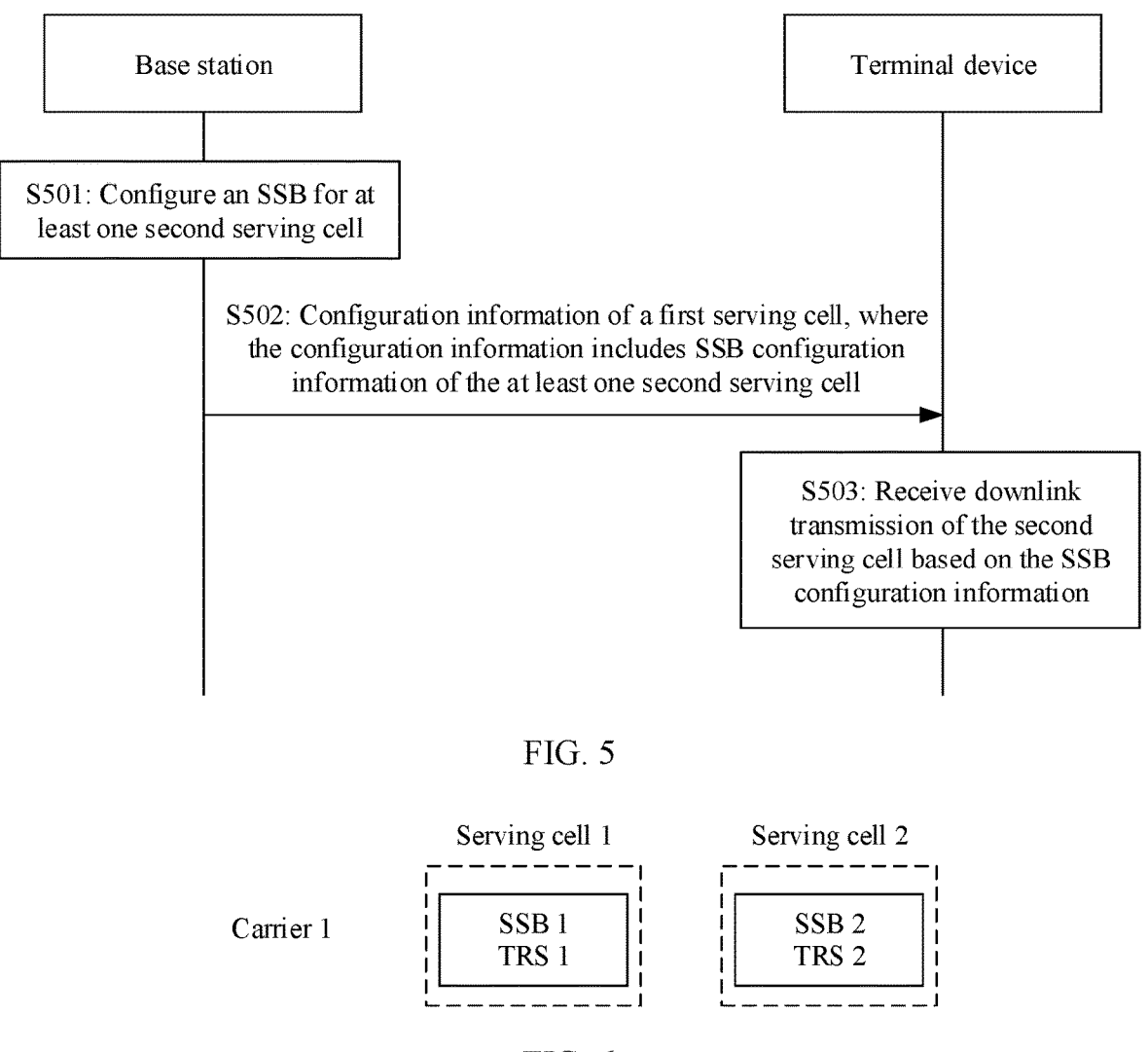
FIG. 5 is a schematic flowchart of a downlink transmission method according to an embodiment of this application.
FIG. 6 is a schematic diagram of a scenario 1 according to an embodiment of this application.

Embodiment 2: FIG. 5 is a flowchart of a downlink transmission method according to this application. The method may be used in a communication device, a chip, a chipset, or the like. The following uses a communication device as an example for description. The method includes the following operations.

S501: A base station configures an SSB for at least one second serving cell.

In some embodiments, the base station may configure a QCL TRS for downlink transmission of a terminal device, and configure the SSB of the at least one second serving cell based on the TRS, where the SSB of the second serving cell and the TRS are quasi-co-located.

S502: The base station sends configuration information of a first serving cell to the terminal device, where the configuration information includes SSB configuration information of the at least one second serving cell, and the second serving cell and the first serving cell have at least one of the following association relationships: operating frequency bands are completely the same, or the operating frequency bands are partially the same. Correspondingly, the terminal device may receive the configuration information of the first serving cell sent by the base station.

In one embodiment, before operation S501, the base station may indicate the first serving cell and the at least one second serving cell to the terminal device. For a process, refer to related descriptions of S401 and S402 in Embodiment 1. Details are not described herein again.

For example, the first serving cell may be a primary cell PCell, and the second serving cell may be a secondary cell. Alternatively, the first serving cell is a cell that currently provides a service for the terminal device, and the second serving cell is a neighboring cell that has an association relationship with the cell. Alternatively, the first serving cell may be a primary serving cell configured by the base station, and the second serving cell may be a neighboring cell that has an association relationship with the primary serving cell. Alternatively, the first serving cell is any cell, and the second serving cell is a serving cell that has an association relationship with the cell.

For the association relationship, refer to related descriptions of the association relationship in Embodiment 1. Details are not described herein again.

In one embodiment, the SSB configuration information may include an SSB index and cell information. For example, the base station sends a TCI state to the terminal device, where the TCI state may include the SSB index, the cell information, a QCL type, and the like.

For example, the cell information may be a cell number, or may be a PCI. The cell number may be an integer ranging from 0 to 1007.

In one embodiment, the SSB configuration information may further include configuration information of at least one carrier, where the second serving cell sends the SSB on the at least one carrier. For example, the base station sends the TCI state to the terminal device, where the TCI state may include the SSB index, the cell information, the QCL type, the configuration information of the at least one carrier, and the like.

For example, the configuration information of the carrier may include at least one of frequency domain location information and a carrier identifier.

In one embodiment, the configuration information may further include an SSB measurement time configuration (SMTC), where the SSB measurement time configuration is used to indicate a time period in which an SSB of the first serving cell is detected, or indicate a time period in which an SSB of the second serving cell is detected. For example, the base station sends the TCI state to the terminal device, where the TCI state may include the SSB index, the cell information, the QCL type, the configuration information of the at least one carrier, the SSB measurement time configuration, and the like.

It may be understood that the TCI state may include an SSB index of the first serving cell, and may further include an SSB index of the at least one second serving cell. The TCI state may include cell information of the first serving cell, and may further include cell information of the at least one second serving cell. The TCI state may further include an association relationship between the SSB index and the cell information.

In one embodiment, the configuration information may further include time domain information of the SSB, for example, a periodicity of the SSB and location information of the SSB in a burst. The configuration information may further include power configuration of the SSB, for example, an average power of the SSB on each RE.

S503: The terminal device receives downlink transmission of the second serving cell based on the SSB configuration information.

For example, the downlink transmission may include, but is not limited to, at least one of the following signals: a data channel, a CSI-RS, or a control channel.

In one embodiment, when a TCI state of the CSI-RS configured by the base station for the terminal device includes the SSB, the base station may further configure information about a power difference between the CSI-RS and the SSB for the terminal device. If there is no cell information and no serving cell identifier, the power difference may represent a power difference between the CSI-RS and an SSB of a current cell. If a serving cell identifier exists, the power difference may represent a power difference between the CSI-RS and an SSB of a serving cell. If cell information exists, the power difference may represent a power difference between the CSI-RS and an SSB of a cell identified by the cell information.

In one embodiment, the terminal device may perform rate matching on the SSB. For example, no data is mapped to a location where an SSB exists. For example, no CSI-RS is mapped to the location where an SSB exists. The location where an SSB exists may be a location of a symbol with the SSB, a resource element RE, a resource block RB, or the like.

Further, if there is no cell information and no serving cell identifier, the SSB on which rate matching is performed may be an SSB of a current cell. If a serving cell identifier exists, the SSB on which rate matching is performed may be an SSB of a serving cell. If a cell information exists, the SSB on which rate matching is performed may be an SSB in a cell identified by the cell information.

To better understand Embodiment 2 of this application, the following provides descriptions with reference to particular scenarios.

Scenario 1: As shown in FIG. 6, a serving cell 1 and a serving cell 2 simultaneously provide services for the terminal device on a same frequency band (for example, a carrier 1), the serving cell 1 sends SSB1 on the carrier 1, and the serving cell 2 sends SSB2 on the carrier 1.

For example, the base station may send the following configuration information to the terminal device:

---

Serving cell 1
{
  NZP CSI-RS1 with trs-info on
  NZP CSI-RS2 with trs-info on
}

---

Serving cell 1{ } is configuration information configured by the base station for the serving cell 1, NZP CSI-RS1 with trs-info on is configuration information configured by the base station for CSI-RS1, NZP CSI-RS1 with trs-info on is associated with TCI state1, and TCI state1 includes SSB1 configuration information of the serving cell 1, such as SSB index and a QCL type. For example, the QCL type is type C, and TCI state1 may include SSB1 with type C.

NZP CSI-RS2 with trs-info on is configuration information configured by the base station for CSI-RS2, NZP CSI-RS2 with trs-info on is associated with TCI state2, and TCI state2 includes SSB2 configuration information of the serving cell 2, such as an SSB index, a PCI of the serving cell 2, and a QCL type. For example, the QCL type is type C, and TCI state2 may include: SSB2 with type C, and PCI of SSB2.

Figures 7, 8:
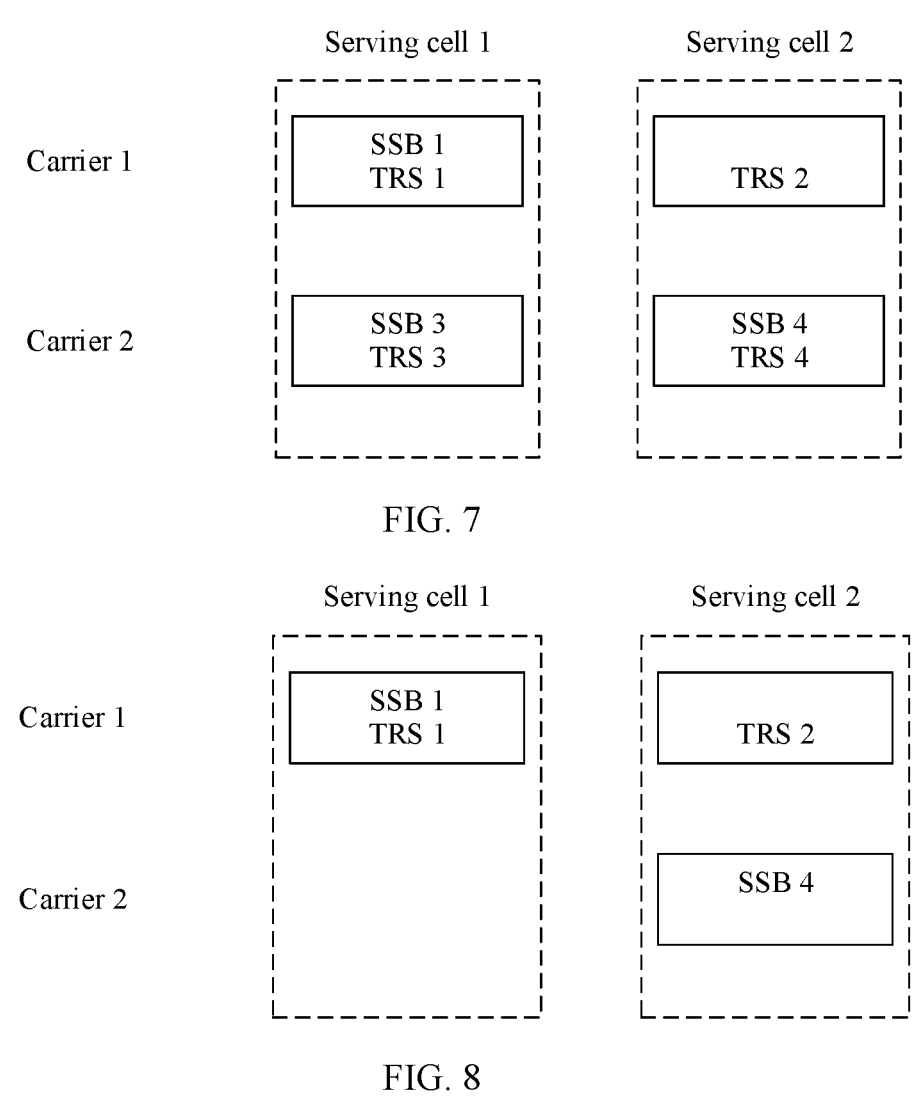
FIG. 7 is a schematic diagram of a scenario 2 according to an embodiment of this application.
FIG. 8 is a schematic diagram of a scenario 3 according to an embodiment of this application.

Scenario 2: As shown in FIG. 7, a serving cell 1 and a serving cell 2 simultaneously provide services for the terminal device on a same frequency band (for example, a carrier 1 and a carrier 2). The serving cell 1 sends SSB1 on the carrier 1, and the serving cell 2 does not send an SSB on the carrier 1. The serving cell 1 sends SSB3 on the carrier 2, and the serving cell 2 sends SSB4 on the carrier 2.

For example, the base station may send the following configuration information to the terminal device:

---

Serving cell 1
{
  NZP CSI-RS1 with trs-info on
  NZP CSI-RS2 with trs-info on
}
Serving cell 2
{
  NZP CSI-RS3 with trs-info on
  NZP CSI-RS4 with trs-info on
}

---

Serving cell 1{ } is configuration information configured by the base station for the serving cell 1, NZP CSI-RS1 with trs-info on is configuration information configured by the base station for CSI-RS1, NZP CSI-RS1 with trs-info on is associated with TCI state1, and TCI state1 includes SSB1 configuration information of the serving cell 1, such as SSB index and a QCL type. For example, the QCL type is type C, and TCI state1 may include SSB1 with type C.

NZP CSI-RS2 with trs-info on is configuration information configured by the base station for CSI-RS2, NZP CSI-RS2 with trs-info on is associated with TCI state2, and TCI state2 includes SSB4 configuration information of the serving cell 2, for example, an SSB index, a PCI of the serving cell 2, a QCL type, and configuration information of the carrier 2. For example, the QCL type is type C, and TCI state2 may include SSB4 with type C, PCI of SSB4, and ssb Frequency or reusing SercCellIndex. ssb Frequency or reusing SercCellIndex is configuration information of the carrier 2.

Serving cell 2{ } is configuration information configured by the base station for the serving cell 2, NZP CSI-RS3 with trs-info on is configuration information configured by the base station for CSI-RS3, NZP CSI-RS3 with trs-info on is associated with TCI state3, and TCI state3 includes SSB3 configuration information of the serving cell 1, such as SSB index and a QCL type. For example, the QCL type is type C, and TCI state3 may include SSB3 with type C.

NZP CSI-RS4 with trs-info on is configuration information configured by the base station for CSI-RS4, NZP CSI-RS4 with trs-info on is associated with TCI state4, and the TCI state4 includes SSB4 configuration information of the serving cell 2, for example, the SSB index, the PCI of the serving cell 2, the QCL type, and the configuration information of the carrier 2. For example, the QCL type is type C, and TCI state4 may include: SSB4 with type C, and PCI of SSB4.

Scenario 3: As shown in FIG. 8, a serving cell 1 and a serving cell 2 simultaneously provide services for the terminal device on a same frequency band (for example, a carrier 1 and a carrier 2). The serving cell 1 sends SSB1 on the carrier 1, and the serving cell 2 does not send an SSB on the carrier 1. The serving cell 2 sends SSB4 on the carrier 2, and the serving cell 1 does not send an SSB on the carrier 2.

For example, the base station may send the following configuration information to the terminal device:

---

Serving cell 1
{
  NZP CSI-RS1 with trs-info on
  NZP CSI-RS2 with trs-info on
}

---

Serving cell 1{ } is configuration information configured by the base station for the serving cell 1, NZP CSI-RS1 with trs-info on is configuration information configured by the base station for CSI-RS1, NZP CSI-RS1 with trs-info on is associated with TCI state1, and TCI state1 includes SSB1 configuration information of the serving cell 1, such as SSB index and a QCL type. For example, the QCL type is type C, and TCI state1 may include SSB1 with type C.

NZP CSI-RS2 with trs-info on is configuration information configured by the base station for CSI-RS2, NZP CSI-RS2 with trs-info on is associated with TCI state2, and the TCI state2 includes SSB4 configuration information of the serving cell 2, for example, an SSB index, a PCI of the serving cell 2, a QCL type, configuration information of the carrier 2, and SMTC configuration information. For example, the QCL type is type C, and TCI state2 may include SSB4 with type C, PCI of SSB4, ssb frequency, and smtcLike ( ).

According to Embodiment 2 of this application, the terminal device may receive a signal of another serving cell in a current serving cell, track the signal of the another serving cell, and then establish a relationship between a synchronization signal and a tracking signal of the another cell and a data channel, a CSI-RS, or a control channel of the another cell, to more accurately receive the data channel, the CSI-RS, or the control channel from the another cell.

Embodiment 3: This application provides a coordinated transmission method. The method may be applied to a base station, a chip, a chipset, or the like. The following uses a base station as an example for description. The method includes the following operations.

A first base station receives first scheduling information of at least one second base station, where the first scheduling information is used to schedule an uplink frequency domain resource. The first base station determines first scheduling information of the first base station based on the first scheduling information of the at least one second base station, where a frequency domain resource scheduled by the first scheduling information of the first base station and a frequency domain resource scheduled by the first scheduling information of the at least one base station have at least one of the following relationships: frequency bands are completely the same, or the frequency bands are partially the same.

Further, the first base station may further receive second scheduling information of at least one base station, where the second scheduling information is used to schedule an uplink time domain resource. The first base station determines second scheduling information of the first base station based on the second scheduling information of the at least one base station. A time domain resource scheduled by the second scheduling information of the first base station is different from a time domain resource scheduled by the second scheduling information of the at least one base station. For example, after receiving second scheduling information of a second base station, the first base station may avoid a time domain resource occupied by uplink scheduling of the second base station.

In addition, the first base station may further receive third scheduling information of at least one base station, where the third scheduling information is used to schedule a downlink transmission resource. The first base station determines third scheduling information of the first base station based on the third scheduling information of the at least one base station, where a CDM group in which a DMRS scheduled by the third scheduling information of the first base station is located is different from a CDM group in which a DMRS scheduled by the second scheduling information of the at least one base station is located.

In one embodiment, the first scheduling information, the second scheduling information, and the third scheduling information may be separately carried in three messages for sending. Alternatively, the first scheduling information, the second scheduling information, and the third scheduling information may be carried in one message for sending. Alternatively, two of the first scheduling information, the second scheduling information, and the third scheduling information may be carried in a same message for sending, and the other one may be carried in another message for sending. For example, the first scheduling information and the second scheduling information are carried in a same message for sending, and the third scheduling information is carried in another message for sending. This is not listed one by one herein.

Embodiment 4: This application provides another coordinated transmission method. The method may be applied to a base station, a chip, a chipset, or the like. The following uses a base station as an example for description. The method includes the following operations.

A control device determines corresponding first scheduling information of at least one base station, where the first scheduling information is used to schedule an uplink frequency domain resource. Frequency domain resources scheduled by the first scheduling information of the at least one base station have at least one of the following relationships: frequency bands are completely the same, or the frequency bands are partially the same. In addition, the control device sends the corresponding first scheduling information to the at least one base station. Correspondingly, any one of the at least one base station receives the first scheduling information allocated by the control device to the base station, and determines the uplink frequency domain resource based on the first scheduling information allocated by the control device to the base station.

Further, the control device may further determine corresponding second scheduling information of the at least one base station, where the second scheduling information is used to schedule an uplink time domain resource, and time domain resources scheduled by the second scheduling information of the at least one base station are different. In addition, the control device sends the corresponding second scheduling information to the at least one base station. Correspondingly, any one of the at least one base station receives the second scheduling information allocated by the control device to the base station, and determines the uplink time domain resource based on the second scheduling information allocated by the control device to the base station.

In addition, the control device may further determine corresponding third scheduling information of the at least one base station, where the third scheduling information is used to schedule a downlink transmission resource, and DMRSs scheduled by the third scheduling information of the at least one base station are located in different CDM groups. In addition, the control device sends the corresponding third scheduling information to the at least one base station. Correspondingly, any one of the at least one base station receives the third scheduling information allocated by the control device to the base station, and determines, based on the third scheduling information allocated by the control device to the base station, a CDM group in which a downlink scheduled DMRS is located.

In one embodiment, the control device may be an independent device, and is configured to allocate resources to base stations.

In one embodiment, the control device may alternatively be a centralized control base station. Further, first scheduling information, second scheduling information, and third scheduling information of the control device also meet the foregoing relationship. For example, a frequency domain resource scheduled by the first scheduling information of the control device and the frequency domain resource scheduled by the first scheduling information of the at least one base station have at least one of the following relationships: frequency bands are completely the same, or the frequency bands are partially the same. A time domain resource of the second scheduling information of the control device is different from the time domain resource scheduled by the second scheduling information of the at least one base station. A CDM group in which a DMRS scheduled by the third scheduling information of the control device is different from the CDM group in which the DMRS scheduled by the third scheduling information of the at least one base station is located.

In some embodiments, the first scheduling information, the second scheduling information, and the third scheduling information that are sent by the control device to a base station may be separately carried in three messages for sending. Alternatively, the first scheduling information, the second scheduling information, and the third scheduling information may be carried in one message for sending. Alternatively, two of the first scheduling information, the second scheduling information, and the third scheduling information may be carried in a same message for sending, and the other one may be carried in another message for sending. For example, the first scheduling information and the second scheduling information are carried in a same message for sending, and the third scheduling information is carried in another message for sending. This is not listed one by one herein.

It may be understood that the methods described in the foregoing four embodiments may be separately implemented as one solution, or may be implemented by combining any two as one solution. For example, the methods described in Embodiment 1 and Embodiment 2 may be combined as one solution for implementation, or the methods described in Embodiment 1 and Embodiment 3 may be combined as one solution for implementation. Other possible combinations are not listed one by one herein. Alternatively, any three embodiments may be combined as one solution for implementation. For example, the methods described in Embodiment 1, Embodiment 2, and Embodiment 3 may be combined as one solution for implementation, or the methods described in Embodiment 1, Embodiment 2, and Embodiment 4 may be combined as one solution for implementation.

Figure 9:
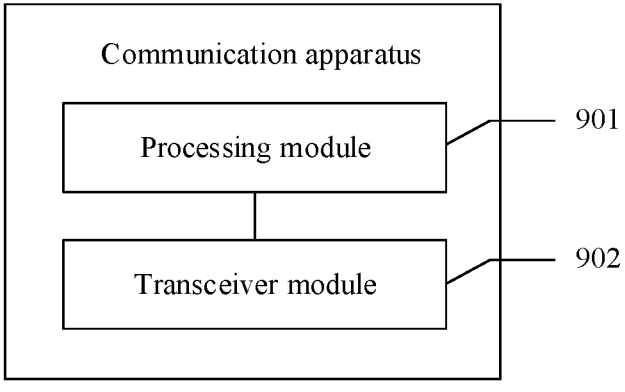
FIG. 9 is a schematic diagram of a structure of an apparatus according to an embodiment of this application.

Based on a same concept as that of the method embodiments, an embodiment of this application provides a communication apparatus. A structure of the communication apparatus may be shown in FIG. 9, and includes a processing module 901 and a transceiver module 902.

In one embodiment, the communication apparatus may be configured to implement the method performed by the terminal device in the embodiment in FIG. 4. The apparatus may be the terminal device, or may be a chip, a chip set, or a part of a chip, where the chip and the chip set are in the terminal device, and the part of the chip is configured to perform a function of a related method. The processing module 901 is configured to determine a plurality of serving cells. The plurality of serving cells have at least one of the following association relationships: operating frequency bands are completely the same, or the operating frequency bands are partially the same. The transceiver module 902 is configured to send uplink signals to the plurality of serving cells determined by the processing module 901, where the sending of the uplink signal meets a preset condition.

In some embodiments, the processing module 901 may be configured to determine the plurality of serving cells based on indication information from a base station. The indication information is used to indicate that the plurality of serving cells have at least one of the following association relationships: the operating frequency bands are completely the same, or the operating frequency bands are partially the same.

In some other embodiments, the processing module 901 may be configured to determine the plurality of serving cells based on configuration information of the plurality of serving cells from a base station.

For example, the configuration information includes frequency domain configuration information. Frequency domain resources configured in frequency domain configuration information of the plurality of serving cells have at least one of the following relationships: frequency bands partially overlap, or the frequency bands completely overlap.

In an example, the preset condition may include at least one of the following:

a total power of the uplink signals of the plurality of serving cells is less than or equal to a maximum transmit power of a terminal device; the total power of the uplink signals of the plurality of serving cells is less than or equal to a maximum transmit power of the terminal device on an overlapping frequency band, where the overlapping frequency band is an overlapping part of the operating frequency bands of the plurality of serving cells; and a power of the uplink signal of any one of the plurality of serving cells is less than or equal to a maximum transmit power of the terminal device in any serving cell.

The processing module 901 may be further configured to: before the processing module 901 sends the uplink signals to the plurality of serving cells, if the sending of the uplink signal does not meet the preset condition, perform power back-off on a power of the uplink signal of at least one of the plurality of serving cells.

When performing power back-off on the power of the uplink signal of at least one of the plurality of serving cells, the processing module 901 may be configured to perform power back-off on the power of the uplink signal of the at least one serving cell based on priorities of the plurality of serving cells.

The processing module 901 may be further configured to determine a transmit power headroom based on the total power of the uplink signals of the plurality of serving cells.

In another example, the preset condition may further be that the uplink signals are sent to the plurality of serving cells in a time division manner.

In one embodiment, the communication apparatus may be configured to implement the method performed by the base station in the embodiment in FIG. 4. The apparatus may be the base station, or may be a chip, a chip set, or a part of a chip, where the chip and the chip set are in the base station, and the part of the chip is configured to perform a function of a related method. The transceiver module 902 is configured to send and receive information. The processing module 901 is configured to: configure a plurality of serving cells for a terminal device, where the plurality of serving cells have at least one of the following association relationships: operating frequency bands are completely the same, or operating frequency bands are partially the same; and indicate, to the terminal device by using the transceiver module 902, that the plurality of serving cells have at least one of the following association relationships: the operating frequency bands are completely the same, or the operating frequency bands are partially the same.

In some embodiments, when indicating, to the terminal device by using the transceiver module 902, that the plurality of serving cells have at least one of the following association relationships: the operating frequency bands are completely the same, or the operating frequency bands are partially the same, the processing module 901 may be configured to send indication information to the terminal device by using the transceiver module 902. The indication information is used to indicate that the plurality of serving cells have at least one of the following association relationships: the operating frequency bands are completely the same, or the operating frequency bands are partially the same.

In some other embodiments, when indicating, to the terminal device by using the transceiver module 902, that the plurality of serving cells have at least one of the following association relationships: the operating frequency bands are completely the same, or the operating frequency bands are partially the same, the processing module 901 may be configured to indicate, to the terminal device by using configuration information of the serving cells, that the plurality of serving cells have at least one of the following association relationships: the operating frequency bands are completely the same, or the operating frequency bands are partially the same.

For example, the configuration information includes frequency domain configuration information. Frequency domain resources configured in frequency domain configuration information of the plurality of serving cells have at least one of the following relationships: frequency bands partially overlap, or the frequency bands completely overlap.

In one embodiment, the communication apparatus may be configured to implement the method performed by the base station in Embodiment 3. The apparatus may be the base station, or may be a chip, a chip set, or a part of a chip, where the chip and the chip set are in the base station, and the part of the chip is configured to perform a function of a related method. The transceiver module 902 is configured to receive first scheduling information of at least one base station, where the first scheduling information is used to schedule an uplink frequency domain resource. The processing module 901 is configured to determine first scheduling information of a current base station based on the first scheduling information of the at least one base station received by the transceiver module 902. A frequency domain resource scheduled by the first scheduling information of the current base station and a frequency domain resource scheduled by the first scheduling information of the at least one base station have at least one of the following relationships: frequency bands are completely the same, or the frequency bands are partially the same.

The transceiver module 902 may be further configured to receive second scheduling information of the at least one base station, where the second scheduling information is used to schedule an uplink time domain resource. The processing module 901 is further configured to determine second scheduling information of the current base station based on the second scheduling information of the at least one base station. A time domain resource scheduled by the second scheduling information of the current base station is different from a time domain resource scheduled by the second scheduling information of the at least one base station.

The transceiver module 902 may be further configured to receive third scheduling information of the at least one base station, where the third scheduling information is used to schedule a downlink transmission resource. The processing module 901 is further configured to determine third scheduling information of the current base station based on the third scheduling information of the at least one base station. A code division multiplexing CDM group in which a demodulation reference signal DMRS scheduled by the third scheduling information of the current base station is located is different from a CDM group in which a DMRS scheduled by the second scheduling information of the at least one base station is located.

In one embodiment, the communication apparatus may be configured to implement the method performed by the control device in Embodiment 4. The apparatus may be the control device, or may be a chip, a chipset, or a part of a chip, where the chip and the chip set are in the control device, and the part of the chip is configured to perform a function of a related method. The processing module 901 is configured to determine corresponding first scheduling information of at least one base station, where the first scheduling information is used to schedule an uplink frequency domain resource. Frequency domain resources scheduled by the first scheduling information of the at least one base station have at least one of the following relationships: frequency bands are completely the same, or the frequency bands are partially the same. The transceiver module 902 may be configured to send the corresponding first scheduling information to the at least one base station.

The processing module 901 may be further configured to determine corresponding second scheduling information of the at least one base station, where the second scheduling information is used to schedule an uplink time domain resource, and time domain resources scheduled by the second scheduling information of the at least one base station are different. The transceiver module 902 may be further configured to send the corresponding second scheduling information to the at least one base station.

The processing module 901 may be further configured to determine corresponding third scheduling information of the at least one base station, where the third scheduling information is used to schedule a downlink transmission resource, and demodulation reference signals DMRSs scheduled by the third scheduling information of the at least one base station are located in different code division multiplexing CDM groups. The transceiver module 902 is further configured to send the corresponding third scheduling information to the at least one base station.

In one embodiment, the communication apparatus may be configured to implement the method performed by the base station in Embodiment 4. The apparatus may be the base station, or may be a chip, a chip set, or a part of a chip, where the chip and the chip set are in the base station, and the part of the chip is configured to perform a function of a related method. The transceiver module 902 is configured to receive first scheduling information allocated by a control device to a first base station, where the first scheduling information is used to schedule an uplink frequency domain resource. A frequency domain resource scheduled by the first scheduling information that is allocated by the control device to the first base station and a frequency domain resource scheduled by first scheduling information that is allocated by the control device to at least one second base station have at least one of the following relationships: frequency bands are completely the same, or the frequency bands are partially the same. The processing module 901 is configured to determine the uplink frequency domain resource based on the first scheduling information allocated by the control device to the first base station.

The transceiver module 902 may be further configured to receive second scheduling information allocated by the control device to the first base station, where the second scheduling information is used for scheduling an uplink time domain resource. A time domain resource scheduled by the second scheduling information that is allocated by the control device to the second base station is different from a time domain resource scheduled by second scheduling information that is allocated by the control device to the at least one second base station. The processing module 901 is further configured to determine an uplink time domain resource based on the second scheduling information allocated by the control device to the first base station.

The transceiver module 902 may be further configured to receive third scheduling information allocated by the control device to the first base station, where the third scheduling information is used to schedule an uplink transmission resource. A code division multiplexing CDM group in which a demodulation reference signal DMRS scheduled by the third scheduling information that is allocated by the control device to the second base station is different from a code division multiplexing CDM group in which a demodulation reference signal DMRS scheduled by third scheduling information that is allocated by the control device to the at least one second base station is located. The processing module 901 is further configured to determine, based on the third scheduling information allocated by the control device to the first base station, a CDM group in which a downlink scheduled DMRS is located.

In one embodiment, the communication apparatus may be used to implement the method performed by the terminal device in Embodiment 2. The apparatus may be the terminal device, or may be a chip, a chip set, or a part of a chip, where the chip and the chip set are in the terminal device, and the part of the chip is configured to perform a function of a related method. The transceiver module 902 is configured to send and receive information. The processing module 901 is configured to: receive configuration information of a first serving cell from a base station by using the transceiver module 902, where the configuration information includes synchronization signal block SSB configuration information of at least one second serving cell, and the second serving cell and the first serving cell have at least one of the following association relationships: operating frequency bands are completely the same, or the operating frequency bands are partially the same; and receive downlink transmission of the second serving cell based on the SSB configuration information.

For example, the synchronization signal block SSB configuration information may include an SSB index and a cell identifier.

The configuration information may further include configuration information of at least one carrier, where the second serving cell sends an SSB on the at least one carrier.

The configuration information of the carrier may include at least one of frequency domain location information and a carrier identifier.

The configuration information may further include an SSB measurement time configuration, where the SSB measurement time configuration is used to indicate a time period in which an SSB of the first serving cell is detected, or indicate a time period in which an SSB of the second serving cell is detected.

In one embodiment, the communication apparatus may be configured to implement the method performed by the base station in Embodiment 2. The apparatus may be the base station, or may be a chip, a chip set, or a part of a chip, where the chip and the chip set are in the base station, and the part of the chip is configured to perform a function of a related method. The processing module 901 is configured to configure a synchronization signal block SSB for at least one second serving cell. The transceiver module 902 is configured to send configuration information of a first serving cell to a terminal device. The configuration information includes SSB configuration information of at least one second serving cell, and the second serving cell and the first serving cell have at least one of the following association relationships:

operating frequency bands are completely the same, or the operating frequency bands are partially the same.

For example, the synchronization signal block (SSB) configuration information includes an SSB index and a cell identifier.

The configuration information may further include configuration information of at least one carrier, where the second serving cell sends an SSB on the at least one carrier.

The configuration information of the carrier may include at least one of frequency domain location information and a carrier identifier.

The configuration information may further include an SSB measurement time configuration, where the SSB measurement time configuration is used to indicate a time period in which an SSB of the first serving cell is detected, or indicate a time period in which an SSB of the second serving cell is detected.

In some embodiments, the processing module 901 may be configured to configure a quasi-co-located tracking reference signal for downlink transmission of the terminal device, and configure the SSB of the at least one second serving cell based on the tracking reference signal, where the tracking reference signal is quasi-co-located with the SSB of the second serving cell.

In embodiments of this application, division of modules is an example, and is merely logical function division. In one embodiment, there may be another division manner. In addition, function modules in embodiments of this application may be integrated into one processor, or each of the modules may exist alone physically, or two or more modules may be integrated into one module. The foregoing integrated module may be implemented in a form of hardware, or may be implemented in a form of a software function module. It may be understood that, for functions or implementations of the modules in embodiments of this application, further refer to related descriptions in the method embodiments.

Figure 10:
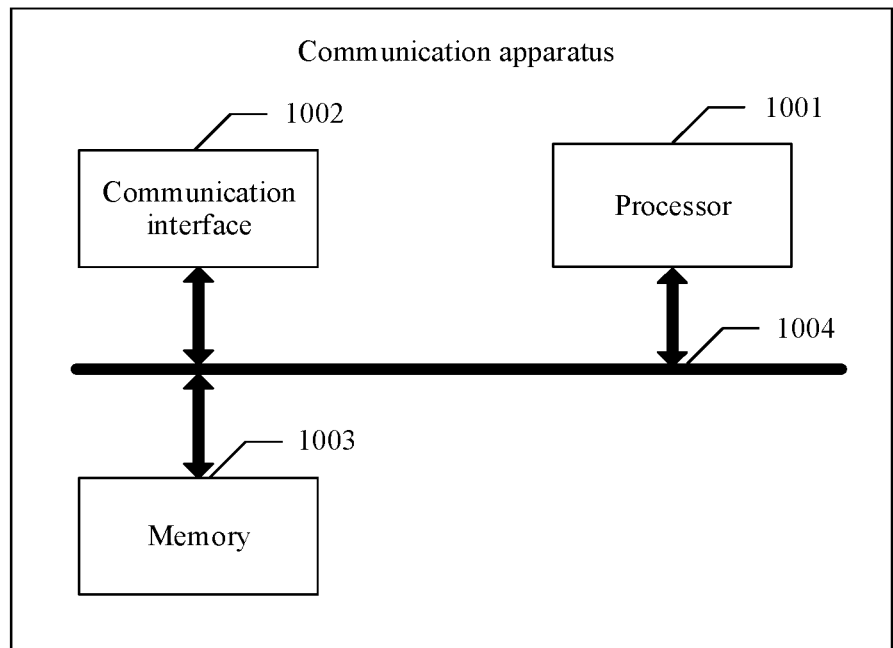
FIG. 10 is another schematic diagram of a structure of an apparatus according to an embodiment of this application.

In a possible manner, the communication apparatus may be shown in FIG. 10. The communication apparatus may be a communication device or a chip in the communication device. The communication device may be a terminal device, or may be a network device. The apparatus may include a processor 1001, a communication interface 1002, and a memory 1003. The processing module 901 may be the processor 1001. The transceiver module 902 may be the communication interface 1002.

The processor 1001 may be a central processing module (c CPU), a digital processing module, or the like. The communication interface 1002 may be a transceiver, an interface circuit such as a transceiver circuit, a transceiver chip, or the like. The apparatus further includes the memory 1003, configured to store a program executed by the processor 1001. The memory 1003 may be a nonvolatile memory such as a hard disk drive (HDD) or a solid-state drive (SSD), or may be a volatile memory, for example, a random access memory (RAM). The memory 1003 is any other medium that can be used to carry or store expected program code that is in a form of an instruction or a data structure and that is accessible to a computer, but is not limited thereto.

The processor 1001 is configured to execute a program code stored in the memory 1003, and is configured to execute the actions of the processing module 901. Details are not described herein again in this application. The communication interface 1002 is configured to perform the actions of the transceiver module 902. Details are not described herein again in this application.

A connection medium between the communication interface 1002, the processor 1001, and the memory 1003 is not limited in embodiments of this application. In this embodiment of this application, the memory 1003, the processor 1001, and the communication interface 1002 are connected through a bus 1004 in FIG. 10. The bus is represented by using a thick line in FIG. 10. A connection manner between other components is merely an example for description, and is not limited thereto. The bus may be classified into an address bus, a data bus, a control bus, and the like. For ease of representation, only one thick line is used for representation in FIG. 10, but this does not mean that there is only one bus or only one type of bus.

An embodiment of the present disclosure further provides a computer-readable storage medium, configured to store computer software instructions that need to be executed for execution of the foregoing processor, and the computer-readable storage medium includes a program that needs to be executed for execution of the foregoing processor.

All or some of the foregoing embodiments may be implemented through software, hardware, firmware, or any combination thereof. When software is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium (for example, an SSD).

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a function in one or more processes in the flowcharts and/or in one or more blocks in the block diagrams.

The computer program instructions may be stored in a computer readable memory that can indicate the computer or another programmable data processing device to work in a particular manner, so that the instructions stored in the computer readable memory generate an artifact that includes an instruction apparatus. The instruction apparatus implements a function in one or more processes in the flowcharts and/or in one or more blocks in the block diagrams.

The computer program instructions may be loaded onto the computer or another programmable data processing device, so that a series of operations and operations are performed on the computer or the another programmable device, thereby generating computer-implemented processing. Therefore, the instructions executed on the computer or the another programmable device provide operations for implementing a function in one or more processes in the flowcharts and/or in one or more blocks in the block diagrams.

It is clear that persons skilled in the art can make various modifications and variations to this application without departing from the spirit and scope of this application. This application is intended to cover the modifications and variations of this application provided that they fall within the scope of the following claims and equivalent technologies of this application.

What is claimed is:

1. An uplink transmission method comprising:

determining a plurality of serving cells, wherein operating frequency bands of the plurality of serving cells are partially the same;

sending uplink signals to the plurality of serving cells when the sending of the uplink signals meets a preset condition; and when the sending of the uplink signals does not meet the preset condition, performing power back-off on a power of at least one of the uplink signals of at least one of the plurality of serving cells by multiplying a transmit power of each of the uplink signals having a same priority by a uniform scale factor, the performing the power back-off further comprising:

performing the power back-off on the power of at least one but not all of the uplink signals on a given carrier of the at least one of the plurality of serving cells; and performing power back-off of a first amplitude on a serving cell whose priority is less than a priority threshold, and performing power back-off of a second amplitude on a serving cell whose priority is greater than or equal to the priority threshold, wherein the first amplitude is greater than the second amplitude.

2. The method according to claim 1, wherein, the determining a plurality of serving cells comprises:

determining the plurality of serving cells based on indication information from a base station, wherein the indication information is used to indicate that the operating frequency bands of the plurality of serving cells are partially the same.

3. The method according to claim 1, wherein, the determining a plurality of serving cells comprises:

determining the plurality of serving cells based on configuration information of the plurality of serving cells from a base station.

4. The method according to claim 3, wherein, the configuration information comprises frequency domain configuration information; and frequency domain resources configured in frequency domain configuration information of the plurality of serving cells have frequency bands that partially overlap.

5. The method according to claim 1, wherein, the preset condition comprises at least one of the following:

a total power of the uplink signals of the plurality of serving cells is less than or equal to a maximum transmit power of a terminal device;

the total power of the uplink signals of the plurality of serving cells is less than or equal to a maximum transmit power of the terminal device on an overlapping frequency band, wherein the overlapping frequency band is an overlapping part of the operating frequency bands of the plurality of serving cells; and a power of the uplink signal of any one of the plurality of serving cells is less than or equal to a maximum transmit power of the terminal device in any serving cell.

6. The method according to claim 1, wherein, the performing power back-off on a power of the uplink signal of at least one of the plurality of serving cells comprises:

performing power back-off on the power of the uplink signal of the at least one serving cell based on priorities of the plurality of serving cells.

7. The method according to claim 5, wherein, the method further comprises:

determining a transmit power headroom based on the total power of the uplink signals of the plurality of serving cells.

8. An uplink transmission apparatus comprising:

at least one processor; and one or more memories coupled to the at least one processor storing programming instructions for execution by the at least one processor to:

determine a plurality of serving cells, wherein operating frequency bands of the plurality of serving cells are partially the same;

send uplink signals to the plurality of serving cells when the sending of the uplink signals meets a preset condition; and when the sending of the uplink signals does not meet the preset condition, perform power back-off on a power of at least one of the uplink signals of at least one of the plurality of serving cells by multiplying a transmit power of each of the uplink signals having a same priority by a uniform scale factor, the at least one processor further to:

perform the power back-off on the power of at least one but not all of the uplink signals on a given carrier of the at least one of the plurality of serving cells; and perform power back-off of a first amplitude on a serving cell whose priority is less than a priority threshold, and performing power back-off of a second amplitude on a serving cell whose priority is greater than or equal to the priority threshold, wherein the first amplitude is greater than the second amplitude.

9. The apparatus according to claim 8, wherein, the at least one processor is further to:

determine the plurality of serving cells based on indication information from a base station, wherein the indication information is used to indicate that the operation frequency bands of the plurality of serving cells are partially the same.

10. The apparatus according to claim 8, wherein, the at least one processor is further to:

determine the plurality of serving cells based on configuration information of the plurality of serving cells from a base station.

11. The apparatus according to claim 10, wherein, the configuration information comprises frequency domain configuration information; and frequency domain resources configured in frequency domain configuration information of the plurality of serving cells have frequency bands that partially overlap.

12. The apparatus according to claim 8, wherein, the preset condition comprises at least one of the following:

a total power of the uplink signals of the plurality of serving cells is less than or equal to a maximum transmit power of a terminal device;

the total power of the uplink signals of the plurality of serving cells is less than or equal to a maximum transmit power of the terminal device on an overlapping frequency band, wherein the overlapping frequency band is an overlapping part of the operating frequency bands of the plurality of serving cells; and a power of the uplink signal of any one of the plurality of serving cells is less than or equal to a maximum transmit power of the terminal device in any serving cell.

13. The apparatus according to claim 8, wherein, when performing power back-off on the power of the uplink signal of the at least one of the plurality of serving cells, the at least one processor is further to:

perform power back-off on the power of the uplink signal of the at least one serving cell based on priorities of the plurality of serving cells.

14. The apparatus according to claim 12, wherein, the at least one processor is further to:

determine a transmit power headroom based on the total power of the uplink signals of the plurality of serving cells.

15. An uplink transmission apparatus comprising:

at least one processor; and one or more memories coupled to the at least one processor storing programming instructions for execution by the at least one processor to:

configure a plurality of serving cells for a terminal device, wherein operating frequency bands of the plurality of serving cells are partially the same; and indicate, to the terminal device, that the operating frequency bands of the plurality of serving cells are partially the same, wherein the terminal device is configured to:

send uplink signals to the plurality of serving cells when the sending of the uplink signals meets a preset condition; and when the sending of the uplink signals does not meet the preset condition, perform power back-off on a power of at least one of the uplink signals of at least one of the plurality of serving cells by multiplying a transmit power of each of the uplink signals having a same priority by a uniform scale factor, the terminal device further to:

perform the power back-off on the power of at least one but not all of the uplink signals on a given carrier of the at least one of the plurality of serving cells; and perform power back-off of a first amplitude on a serving cell whose priority is less than a priority threshold, and performing power back-off of a second amplitude on a serving cell whose priority is greater than or equal to the priority threshold, wherein the first amplitude is greater than the second amplitude.

16. The apparatus according to claim 15, wherein, when indicating, to the terminal device, that the plurality of serving cells have the operating frequency bands that are partially the same, the at least one processor further to:

send indication information to the terminal device, wherein the indication information is used to indicate that the plurality of serving cells have the operating frequency bands that are partially the same.

17. The apparatus according to claim 15, wherein, when indicating, to the terminal device, that the plurality of serving cells have the operating frequency bands that are partially the same, the at least one processor further to:

indicate, to the terminal device by using configuration information of the serving cells, that the plurality of serving cells have the operating frequency bands that are partially the same.

18. The apparatus according to claim 17, wherein, the configuration information comprises frequency domain configuration information; and frequency domain resources configured in frequency domain configuration information of the plurality of serving cells have frequency bands that partially overlap.

\*    \*    \*    \*    \*